(12) United States Patent
Ishikawa et al.

(10) Patent No.: US 7,548,340 B2
(45) Date of Patent: Jun. 16, 2009

(54) METHOD, PROGRAM, AND APPARATUS FOR PROHIBITING A REPRODUCTION OF AN ANTI-COPY DOCUMENT, AND A MEDIUM STORING THE PROGRAM

(75) Inventors: Masaaki Ishikawa, Tokyo (JP); Haike Guan, Kanagawa-ken (JP); Takashi Saitoh, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 925 days.

(21) Appl. No.: 10/889,258

(22) Filed: Jul. 13, 2004

(65) Prior Publication Data
US 2005/0052682 A1 Mar. 10, 2005

(30) Foreign Application Priority Data
Jul. 15, 2003 (JP) ............... 2003-197193
Jan. 9, 2004 (JP) ............... 2004-003939

(51) Int. Cl.
*G06F 15/00* (2006.01)
*G06K 1/00* (2006.01)
*H04N 1/60* (2006.01)
*H04N 1/40* (2006.01)
*G06K 15/00* (2006.01)

(52) U.S. Cl. .................. 358/1.9; 358/1.14; 358/3.28
(58) Field of Classification Search .............. 358/1.14, 358/1.9, 3.28; 382/100; 399/366; 713/176
See application file for complete search history.

(56) References Cited

U.S. PATENT DOCUMENTS

| | | | |
|---|---|---|---|
| 4,953,196 A | 8/1990 | Ishikawa et al. | |
| 5,038,202 A | 8/1991 | Ooishi et al. | |
| 5,571,854 A | 11/1996 | Ishida et al. | |
| 5,613,016 A | 3/1997 | Saitoh | |
| 5,647,010 A * | 7/1997 | Okubo et al. | ............... 382/100 |
| 5,652,803 A | 7/1997 | Tachikawa et al. | |
| 5,659,628 A | 8/1997 | Tachikawa et al. | |
| 5,774,580 A | 6/1998 | Saitoh | |
| 5,907,631 A | 5/1999 | Saitoh | |
| 6,064,774 A | 5/2000 | Takatsu et al. | |
| 6,178,434 B1 | 1/2001 | Saitoh | |
| 6,272,242 B1 | 8/2001 | Saitoh et al. | |
| 6,272,248 B1 | 8/2001 | Saitoh et al. | |

(Continued)

FOREIGN PATENT DOCUMENTS

JP 05-244414 9/1993

(Continued)

*Primary Examiner*—Douglas Q Tran
(74) *Attorney, Agent, or Firm*—Dickstein Shapiro LLP

(57) ABSTRACT

A method and apparatus of image processing includes first and second memories and first and second copy protector units. The first memory stores a first reference value representing a first characteristic quantity of a predetermined background dot pattern. The first copy protector unit performs a first copy protection operation for detecting a characteristic quantity from an image, comparing the characteristic quantity with the first reference value, and determining whether the characteristic quantity is identical to the first reference value. The second memory stores a second reference value representing a second characteristic quantity of the predetermined background dot pattern. The second copy protector unit performs a second copy protection operation, different from the first copy protection operation, for detecting a characteristic quantity from the image, comparing the characteristic quantity with the second reference value, and determining whether the characteristic quantity is identical to the second reference value.

56 Claims, 16 Drawing Sheets

U.S. PATENT DOCUMENTS

| | | |
|---|---|---|
| 6,289,120 B1 | 9/2001 | Yamaai et al. |
| 6,289,121 B1 | 9/2001 | Abe et al. |
| 6,289,131 B1 | 9/2001 | Ishikawa |
| 6,353,840 B2 | 3/2002 | Saito et al. |
| 6,681,047 B1 | 1/2004 | Saito |
| 6,782,477 B2 * | 8/2004 | McCarroll ................... 713/189 |
| 2002/0084978 A1 | 7/2002 | Araki et al. |
| 2002/0136427 A1 * | 9/2002 | Staring et al. ............... 382/100 |
| 2003/0198398 A1 | 10/2003 | Guan et al. |
| 2004/0090646 A1 | 5/2004 | Saitoh et al. |

FOREIGN PATENT DOCUMENTS

| | | |
|---|---|---|
| JP | 06-105140 | 4/1994 |
| JP | 06-125459 | 5/1994 |
| JP | 07-036317 | 2/1995 |
| JP | 07-087309 | 3/1995 |
| JP | 3078433 | 3/1995 |
| JP | 2001-086330 | 3/2001 |
| JP | 2001-094776 | 4/2001 |
| JP | 2001-197297 | 7/2001 |

* cited by examiner

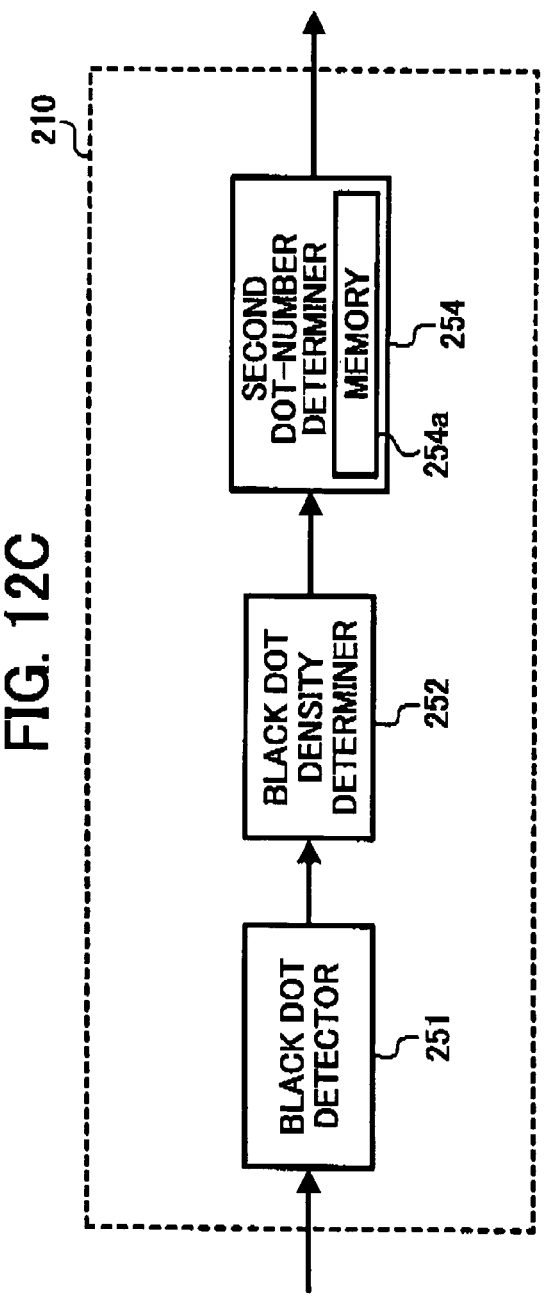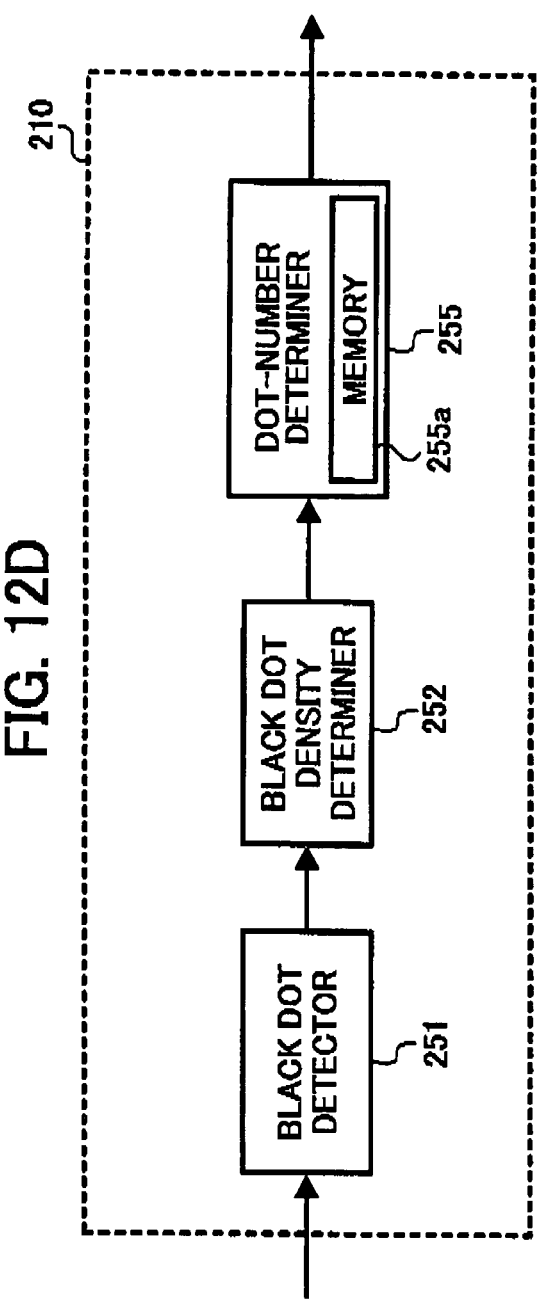

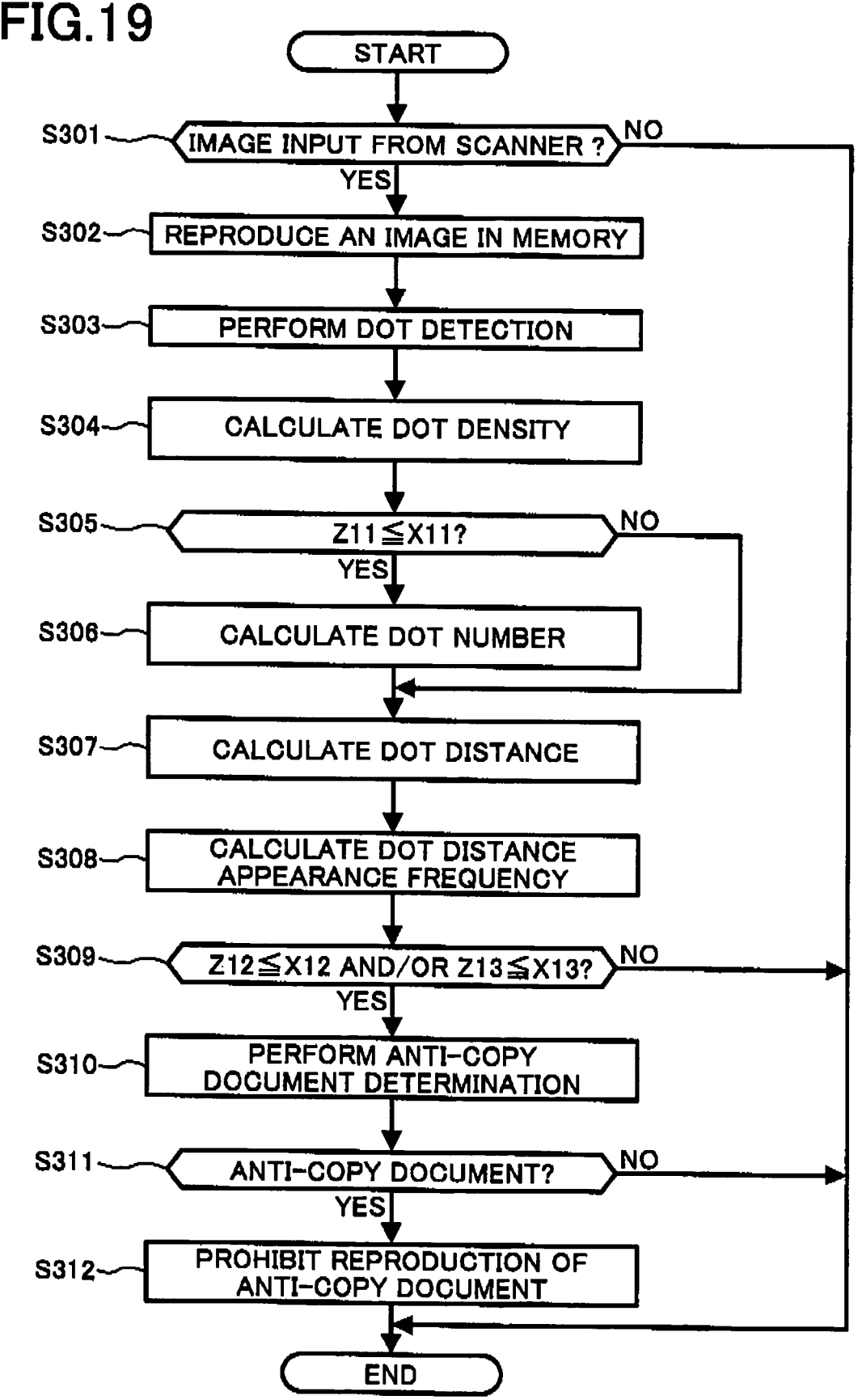

METHOD, PROGRAM, AND APPARATUS FOR PROHIBITING A REPRODUCTION OF AN ANTI-COPY DOCUMENT, AND A MEDIUM STORING THE PROGRAM

CROSS-REFERENCE TO RELATED APPLICATIONS

This patent specification is based on Japanese patent applications, No. 2003-197193 filed on Jul. 15, 2003 and No. 2004-003939 filed on Jan. 9, 2004, in the Japan Patent Office, the entire contents of which are incorporated by reference herein.

STATEMENT REGARDING FEDERALLY SPONSORED RESEARCH OR DEVELOPMENT

Not Applicable.

REFERENCE TO A COMPACT DISK APPENDIX

Not Applicable.

BACKGROUND OF THE INVENTION

Field of the Invention

The present invention relates to a method, program, and apparatus for copy protection, and more particularly to a method, program, and apparatus for detecting a copy-prohibited document and prohibiting a reproduction of the detected copy-prohibited document. The present invention also relates to a computer readable storage medium storing the above-mentioned program for detecting a copy-prohibited document and prohibiting a reproduction of the detected copy-prohibited document.

BRIEF SUMMARY OF THE INVENTION

Discussion of the Background

With recent improvements in image processing and image forming technologies, it has become possible that a high-tech digital color copying apparatus, for example, can reproduce a monetary document even with a high fidelity such that the reproduced image is hardly distinguished from the original image. Such monetary document is a paper currency, a security, and the like, for example, and will not normally be placed as an object of copying since an authorized currency creation is illegal. Therefore, the high-tech digital color copying apparatus is needed to be provided with a feature of prohibiting a reproduction of a copy-prohibited document such as a monetary document, a confidential document, etc. With this feature, a copy-prohibited document may entirely be prohibited from being reproduced or can be reproduced into a nonreadable image, for example.

In offices, there are many confidential documents which are not necessarily the monetary documents but are prohibited from being copied from a viewpoint of trade secrets. These documents in offices are also needed to be prohibited from being copied with the high-tech digital color copying apparatuses.

Under these circumstances, various inventions associated with the above-mentioned high-tech digital color copying apparatus have been conducted to attempt to restrict the capability of an image reproduction with a high fidelity.

Japanese Laid-Open Unexamined Patent Application Publication, No. 06-125459 describes a technique for recognizing a special document such as a currency, a security, and so on by comparing input image data with a prestored specific mark by a pattern matching and judging that the input image data is a special document when the input image data is recognized as matching the prestored specific mark. Japanese Laid-Open Unexamined Patent Application Publication, No. 2001-086330 also describes a similar technique. If an input original is judged as a special document easily in this way, a reproduction of this document can readily be prohibited.

This technique accordingly requires a storage of reference pattern data to be applied to the copy protection for a specific document. However, it would be difficult to apply this reference pattern data which is the fixed data to the copy protection for an indefinite number of general confidential documents.

As another example, Japanese Laid-Open Unexamined Patent Application Publication, No. 07-036317 describes a technique for recognizing a confidential document dealt as a copy-prohibited document by detecting a specific mark such as "CONFIDENTIAL," for example, printed on this confidential document indicative of its confidentiality. A print of such a specific mark indicating the document confidentiality in a confidential document is a common practice and the above-mentioned publication uses it. When an input original is judged as a special document easily in this way, a reproduction of this document can readily be prohibited. Japanese Laid-Open Unexamined Patent Application Publication, No. 07-087309 also describes a similar method.

However, when a confidential document has a print of a specific confidential mark such as "CONFIDENTIAL," for example, a copy of this confidential document can easily be made with avoiding a print of the specific confidential mark by hiding it with a piece of paper, for example. Thus, the copy protection fails to protect the confidential document from copying.

Japanese Laid-Open Unexamined Patent Application Publication, No. 09-164739 also describes a similar technique for restricting a copying of document by embedding a watermark in an original image which is desired to be protected from copying. This technique uses a paper sheet having a specific background image to which an original image is attached. The specific background image includes a background dot pattern having a base area and a message area. From its nature, the background dot pattern is inconspicuous in comparison with the original image and therefore it does not cause a hitch to readings of the original image. This technique, however, causes the background dot pattern to appear when the original image having this background dot pattern is copied. The background dot pattern of this technique is provided with a word of warning such as an "anti-copy," for example, so that a copy of this original document is recognized easily at a glance as a confidential document which is desired to be protected from copying. Therefore, this technique has a psychological effect of restricting against the copying of document.

However, this technique produces the above-mentioned psychological effect only after the copying made. Therefore, for the persons who do not care about the occurrence of the background dot pattern, the copy protection does not work at all.

SUMMARY OF THE INVENTION

In view of the foregoing, it is an object of the present invention to provide a novel image processing apparatus which securely protects a reproduction of a copy-prohibited document.

Another object of the present invention to provide a novel image processing method which securely protects a reproduction of a copy-prohibited document.

Another object of the present invention to provide a novel computer program product stored on a computer readable medium for executing an image processing method of securely protecting a reproduction of a copy-prohibited document.

Another object of the present invention to provide a novel computer readable medium storing computer instructions for executing an image processing method of securely protecting a reproduction of a copy-prohibited document.

To achieve the above-mentioned object, in one embodiment, a novel image processing apparatus includes a first memory, a first copy protector unit, a second memory, and a second copy protector unit. The first memory stores a first reference value representing a first characteristic quantity of a predetermined background dot pattern. The first copy protector unit is configured to perform a first copy protection operation for detecting a characteristic quantity from image data of an original image, comparing the characteristic quantity from the image data of the original image with the first reference value stored in the first memory, and determining whether the characteristic quantity from the image data of the original image is identical to the first reference value. The second memory stores a second reference value representing a second characteristic quantity of the predetermined background dot pattern. The second copy protector unit is configured to perform a second copy protection operation, different from the first copy protection operation, for detecting a characteristic quantity from the image data of the original image, comparing the characteristic quantity from the image data of the original image with the second reference value stored in the second memory, and determining whether the characteristic quantity from the image data of the original image is identical to the second reference value.

The predetermined background dot pattern may be a dot pattern in which each of the first and second characteristic quantities is produced based on a relationship between dots having sizes substantially equal to each other and which is defined as a copy-prohibited background dot pattern based on the first and second characteristic quantities.

The first and second copy protector units may simultaneously perform the first and second copy protection operations, respectively, in parallel.

The first copy protector unit may perform the first copy protection operation with digital circuits and the second copy protector unit performs the second copy protection operation in accordance with a program installed in a computer included in the image processing apparatus.

The first copy protector unit may be set to a condition to perform the first copy protection operation with relatively small number of occurrences of excessively rigorous determinations and a relatively great number of occurrences of erroneous dot detection or omission and the second copy protector unit may be set to a condition to perform the second copy protection operation with a relatively great number of occurrences of excessively rigorous determinations and a relatively small number of occurrences of erroneous dot detection or omission.

The first copy protector unit may determine that the characteristic quantity from the image data of the original image is identical to the first reference value when a difference between the characteristic quantity from the image data of the original image and the first reference value is smaller than a predetermined threshold value.

The second copy protector unit may determine that the characteristic quantity from the image data of the original image is identical to the second reference value when a difference between the characteristic quantity from the image data of the original image and the second reference value is smaller than a predetermined threshold value.

The first copy protector unit may determine that the characteristic quantity from the image data of the original image is identical to the first reference value when a difference between the characteristic quantity from the image data of the original image and the first reference value is smaller than a first predetermined threshold value, and the second copy protector unit may determine that the characteristic quantity from the image data of the original image is identical to the second reference value when a difference between the characteristic quantity from the image data of the original image and the second reference value is smaller than a second predetermined threshold value which is smaller than the first predetermined threshold value.

The predetermined background dot pattern may be a dot pattern in which each of the first and second characteristic quantities is produced based on a relationship between dots having sizes substantially equal to each other and which is defined as a copy-prohibited background dot pattern based on the first and second characteristic quantities. In this case, the first copy protector unit may detect a dot density as a characteristic quantity and performs a process for determining whether the detected characteristic quantity is identical to the first reference value, and the second copy protector unit detects a dot distance as a characteristic quantity and performs a process for determining whether the detected characteristic quantity is identical to the second reference value.

The first copy protector unit may perform a first reproduction prohibition process upon determining the detected characteristic quantity as identical to the first reference value, and the second copy protector unit may perform a second reproduction prohibition process upon determining the detected characteristic quantity as identical to the second reference value.

The first reproduction prohibition process may be a process for prohibiting a reproduction of the image data of the original image and the second reproduction prohibition process may be a process for sending a notification to external equipment of a determination result.

Further, in one example, a novel image processing method includes the steps of first storing, second storing, first performing, and second performing. The first storing step stores a first reference value representing a first characteristic quantity of a predetermined background dot pattern. The second storing step stores a second reference value representing a second characteristic quantity of the predetermined background dot pattern. The first performing step performs a first copy protection operation which comprises sub-steps of detecting, comparing, and determining. The detecting step detects a characteristic quantity from image data of an original image. The comparing step compares the characteristic quantity from the image data of the original image with the first reference value stored in the first reference value storing step. The determining step determines whether the characteristic quantity from the image data of the original image is identical to the first reference value. The second performing step performs a second copy protection operation, which is different from the first copy protection operation. The second performing step includes sub-steps of detecting, comparing, and determining. The detecting step detects a characteristic quantity from the image data of the original image. The comparing step compares the characteristic quantity from the image data of the original image with the second reference value stored in the second reference value storing step. The determining step determines whether the characteristic quantity from the image data of the original image is identical to the second reference value.

The predetermined background dot pattern may be a dot pattern in which each of the first and second characteristic quantities is produced based on a relationship between dots having sizes substantially equal to each other and which is defined as a copy-prohibited background dot pattern based on the first and second characteristic quantities.

The performing steps of the first and second copy protection operations may simultaneously perform the first and second copy protection operations, respectively, in parallel.

The step of the first copy protection operation may perform the first copy protection operation with digital circuits and the step of the second copy protection operation may perform the second copy protection operation in accordance with a program installed in a computer included in the image processing apparatus.

The step of the first copy protection operation may be set to a condition to perform the first copy protection operation with relatively small number of occurrences of excessively rigorous determinations and a relatively great number of occurrences of erroneous dot detection or omission and the step of the second copy protection operation may be set to a condition to perform the second copy protection operation with a relatively great number of occurrences of excessively rigorous determinations and a relatively small number of occurrences of erroneous dot detection or omission.

The step of the first copy protection operation may determine that the characteristic quantity from the image data of the original image is identical to the first reference value when a difference between the characteristic quantity from the image data of the original image and the first reference value is smaller than a predetermined threshold value.

The step of the second copy protection operation may determine that the characteristic quantity from the image data of the original image is identical to the second reference value when a difference between the characteristic quantity from the image data of the original image and the second reference value is smaller than a predetermined threshold value.

The step of the first copy protection operation may determine that the characteristic quantity from the image data of the original image is identical to the first reference value when a difference between the characteristic quantity from the image data of the original image and the first reference value is smaller than a first predetermined threshold value, and the step of the second copy protection operation may determine that the characteristic quantity from the image data of the original image is identical to the second reference value when a difference between the characteristic quantity from the image data of the original image and the second reference value is smaller than a second predetermined threshold value which is smaller than the first predetermined threshold value.

The predetermined background dot pattern may be a dot pattern in which each of the first and second characteristic quantities is produced based on a relationship between dots having sizes substantially equal to each other and which is defined as a copy-protected background dot pattern based on the first and second characteristic quantities. In this case, the step of the first copy protection operation may detect a dot density as a characteristic quantity and performs a process for determining whether the detected characteristic quantity is identical to the first reference value, and the step of the second copy protection operation may detect a dot distance as a characteristic quantity and performs a process for determining whether the detected characteristic quantity is identical to the second reference value.

The step of the first copy protection operation may perform a first reproduction prohibition process upon determining the detected characteristic quantity as identical to the first reference value, and the step of the second copy protection operation may perform a second reproduction prohibition process upon determining the detected characteristic quantity as identical to the second reference value.

The first reproduction prohibition process may be a process for prohibiting a reproduction of the image data of the original image and the second reproduction prohibition process may be a process for sending a notification to external equipment of a determination result.

Further, in one example, the present invention provides a novel computer program product stored on a computer readable storage medium for instructing a computer which has digital circuits for performing a first copy protection operation, to execute a second copy protection operation which is smaller than the first copy protection operation. In the computer program product, the second copy protection operation includes the steps of storing, detecting, comparing, and determining. The storing step stores a second reference value representing a second characteristic quantity of a predetermined background dot pattern. The detecting step detects a characteristic quantity from image data of an original image. The comparing step compares the characteristic quantity from the image data of the original image with the second reference value stored in the second reference value storing step. The determining step determines whether the characteristic quantity from the image data of the original image is identical to the second reference value.

The first copy protection operation executed by the digital circuits of the computer may include the steps of storing, detecting, comparing, and determining. The storing step stores a first reference value representing a first characteristic quantity of the predetermined background dot pattern. The detecting step detects a characteristic quantity from the image data of the original image. The comparing step compares the characteristic quantity from the image data of the original image with the first reference value stored in the first reference value storing step. The determining step determines whether the characteristic quantity from the image data of the original image is identical to the first reference value.

The predetermined background dot pattern may be a dot pattern in which each of the first and second characteristic quantities is produced based on a relationship between dots having sizes substantially equal to each other and which is defined as a copy-prohibited background dot pattern based on the first and second characteristic quantities.

The first and second copy protection operations may be simultaneously performed in parallel.

The first copy protection operation may be set to conditions of relatively small number of occurrences of excessively rigorous determinations and a relatively great number of occurrences of erroneous dot detection or omission and the second copy protection operation may be set to conditions of a relatively great number of occurrences of excessively rigorous determinations and a relatively small number of occurrences of erroneous dot detection or omission.

The determining step of the second copy protection operation may determine that the characteristic quantity from the image data of the original image is identical to the second reference value when a difference between the characteristic quantity from the image data of the original image and the second reference value is smaller than a predetermined threshold value.

The determining step of the first copy protection operation may determine that the characteristic quantity from the image data of the original image is identical to the first reference value when a difference between the characteristic quantity from the image data of the original image and the first reference value is smaller than a first predetermined threshold value, and the determining step of the second copy protection operation may determine that the characteristic quantity from the image data of the original image is identical to the second reference value when a difference between the characteristic quantity from the image data of the original image and the second reference value is smaller than a second predetermined threshold value which is smaller than the first predetermined threshold value.

The predetermined background dot pattern may be a dot pattern in which each of the first and second characteristic quantities is produced based on a relationship between dots having sizes substantially equal to each other and which is defined as a copy-protected background dot pattern based on the first and second characteristic quantities. In this case, the detecting step of the first copy protection operation may detect a dot density as a characteristic quantity and the determining step of the first copy protection operation determines whether the detected characteristic quantity is identical to the first reference value. Further, the detecting step of the second copy protection operation may detect a dot distance as a characteristic quantity and the determining step of the second copy protection operation determines whether the detected characteristic quantity is identical to the second reference value.

The first copy protection operation may further include the step of performing a first reproduction prohibition process upon a time the determining step of the first copy protection operation determines that the detected characteristic quantity as identical to the first reference value. In this case, the computer program product may further include the step of performing a second reproduction prohibition process upon determining the detected characteristic quantity as identical to the second reference value by the determining step of the second copy protection operation.

The first reproduction prohibition process may be a process for prohibiting a reproduction of the image data of the original image and the second reproduction prohibition process may be a process for sending a notification to external equipment of a determination result.

Further, in one example, the present invention provides a novel computer readable storage medium storing computer instructions for instructing a computer which has digital circuits for performing a first copy protection operation, to execute a second copy protection operation which is smaller than the first copy protection operation, the computer instructions comprising the steps of storing, detecting, comparing, and determining. The storing step stores a second reference value representing a second characteristic quantity of a predetermined background dot pattern. The detecting step detects a characteristic quantity from image data of an original image. The comparing step compares the characteristic quantity from the image data of the original image with the second reference value stored in the second reference value storing step. The determining step determines whether the characteristic quantity from the image data of the original image is identical to the second reference value.

The first copy protection operation executed by the digital circuits of the computer may include the steps of storing, detecting, comparing, and determining. The storing step stores a first reference value representing a first characteristic quantity of the predetermined background dot pattern. The detecting step detects a characteristic quantity from the image data of the original image. The comparing step compares the characteristic quantity from the image data of the original image with the first reference value stored in the first reference value storing step. The determining step determines whether the characteristic quantity from the image data of the original image is identical to the first reference value.

The predetermined background dot pattern may be a dot pattern in which each of the first and second characteristic quantities is produced based on a relationship between dots having sizes substantially equal to each other and which is defined as a copy-prohibited background dot pattern based on the first and second characteristic quantities.

The first and second copy protection operations may simultaneously be performed in parallel.

The first copy protection operation may be set to conditions of relatively small number of occurrences of excessively rigorous determinations and a relatively great number of occurrences of erroneous dot detection or omission and the second copy protection operation may be set to conditions of a relatively great number of occurrences of excessively rigorous determinations and a relatively small number of occurrences of erroneous dot detection or omission.

The determining step of the second copy protection operation may determine that the characteristic quantity from the image data of the original image is identical to the second reference value when a difference between the characteristic quantity from the image data of the original image and the second reference value is smaller than a predetermined threshold value.

The determining step of the first copy protection operation may determine that the characteristic quantity from the image data of the original image is identical to the first reference value when a difference between the characteristic quantity from the image data of the original image and the first reference value is smaller than a first predetermined threshold value, and the determining step of the second copy protection operation may determine that the characteristic quantity from the image data of the original image is identical to the second reference value when a difference between the characteristic quantity from the image data of the original image and the second reference value is smaller than a second predetermined threshold value which is smaller than the first predetermined threshold value.

The predetermined background dot pattern may be a dot pattern in which each of the first and second characteristic quantities is produced based on a relationship between dots having sizes substantially equal to each other and which is defined as a copy-protected background dot pattern based on the first and second characteristic quantities. In this case, the detecting step of the first copy protection operation may detect a dot density as a characteristic quantity and the determining step of the first copy protection operation may determine whether the detected characteristic quantity is identical to the first reference value. Further, the detecting step of the second copy protection operation may detect a dot distance as a characteristic quantity and the determining step of the second copy protection operation may determine whether the detected characteristic quantity is identical to the second reference value.

The first copy protection operation may further include the step of performing a first reproduction prohibition process upon a time the determining step of the first copy protection operation determines that the detected characteristic quantity as identical to the first reference value. In this case, the computer program product may further include the step of performing a second reproduction prohibition process upon determining the detected characteristic quantity as identical to the second reference value by the determining step of the second copy protection operation.

The first reproduction prohibition process may be a process for prohibiting a reproduction of the image data of the original image and the second reproduction prohibition process may be a process for sending a notification to external equipment of a determination result.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 12A-12D are schematic block diagrams of a background dot pattern detector and its variations;

FIGS. 18 and 19 are flowcharts of an exemplary procedure of first and second copy protection operations performed by the image processing apparatus of FIG. 17.

DETAILED DESCRIPTION OF THE INVENTION

Figure 1:
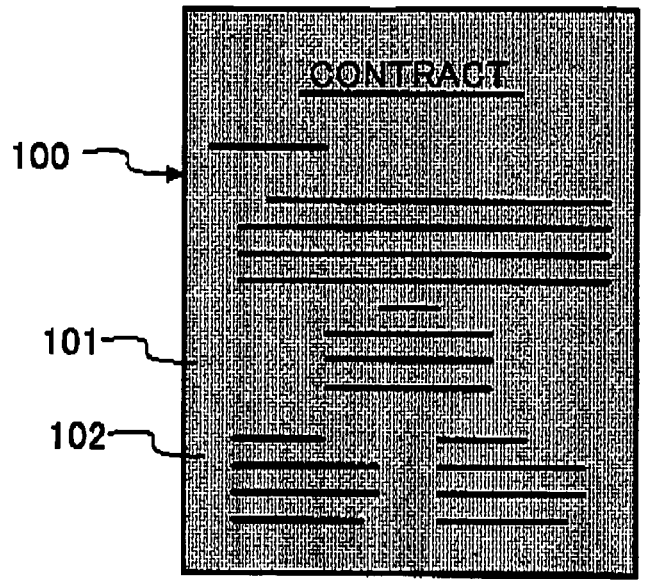
FIG. 1 is an illustration for explaining an original image of an exemplary contract sheet.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIGS. 1-10B, a background dot pattern or an anti-copy watermark are explained, which is typically used in a copy protection system, for example, adopted by an image processing apparatus according to exemplary embodiments of the present invention.

Figure 2:
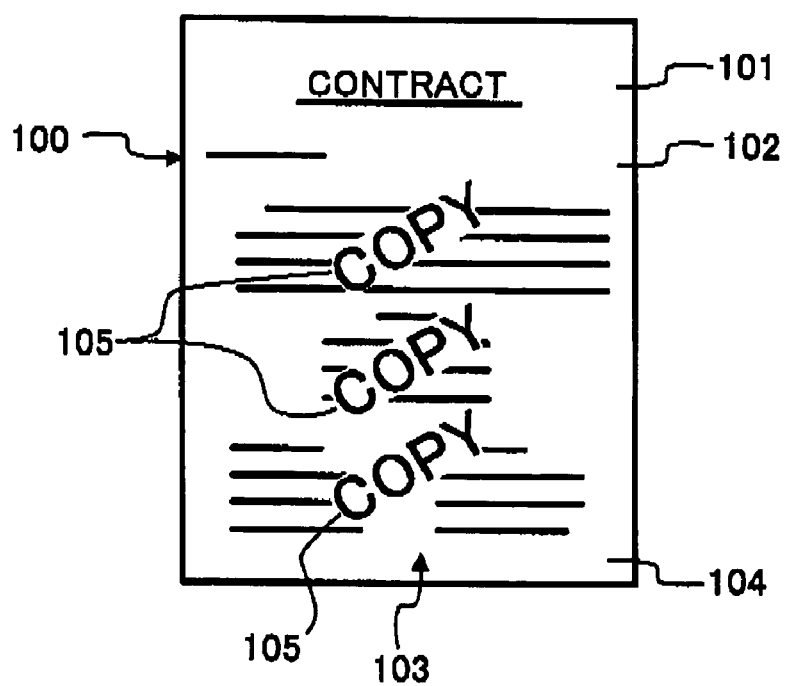
FIG. 2 is an illustration for explaining an exemplary reproduction of the contract sheet of FIG. 1 in which a background dot pattern made as an anti-copy watermark pattern embedded in the original image of the contract sheet appears.
Figure 3:
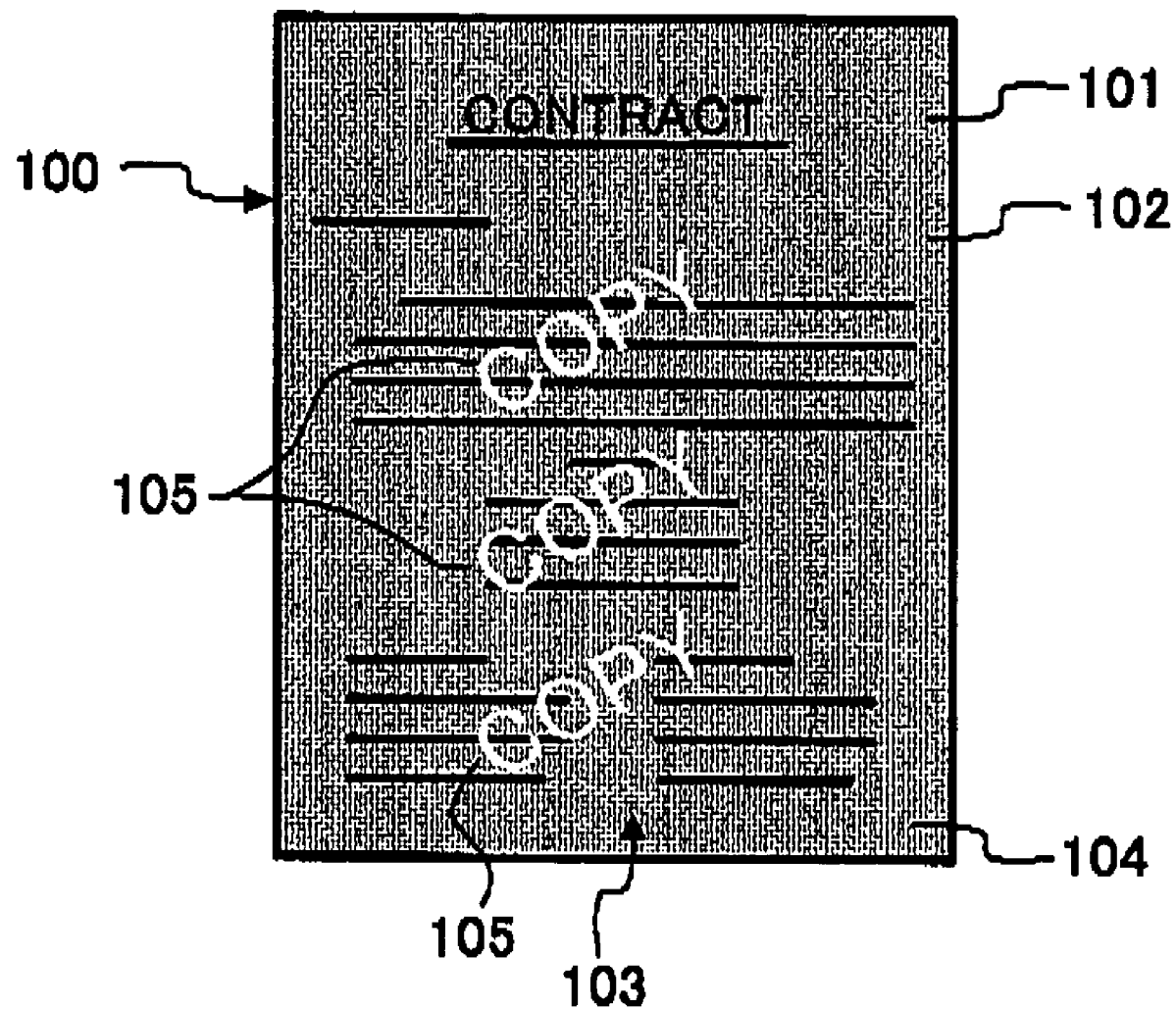
FIG. 3 is an illustration for explaining another exemplary reproduction of the contract sheet of FIG. 1 in which a background dot pattern made as an anti-copy watermark pattern embedded in the original image of the contract sheet appears.

FIG. 1 shows a contract sheet 100 as an example of an anti-copy original document in order to demonstrate one example of a layer copy control operation for allowing a desired part in a layer (e.g., a background) to be copied and other parts in the layer to be against copying. The contract sheet 100 includes an original image 101 indicating a specific contract and an original sheet 102 on which the original image 101 is printed. FIG. 2 shows one exemplary copy of the contract sheet 100. In this copy of FIG. 2, a background dot pattern 103 embedded as a background dot pattern in the surface of the original sheet 102 is brought to appear as a plurality of words "COPY" together with the original image 101. The background dot pattern 103 includes a base area 104 and a plurality of message areas 105. FIG. 3 shows another exemplary copy of the contract sheet 100.

Alternatively, the background dot pattern 103 can be added to the surface of the original sheet 102 when the original image 101 is formed thereon, instead of being previously embedded in the surface of the original sheet 102.

In the background dot pattern 103, the base area 104 represents a background area which is a major portion of the background dot pattern 103. The message areas 105 are the areas distributed within the base area 104 for expressing messages such as a word "COPY," for example. Of course, any other words, phrases, letters, symbols, etc. can be expressed in the message areas 105. The base area 104 and the message areas 105 are not a separation based on a basic structural difference from each other but it is just a separation based on value judgments on visuals.

When a copy is made from the contract sheet 100 thus having the original image 101 printed on the original sheet 102, a part of the background dot pattern 103, that is, either the base area 104 or the message areas 105 appear together with the original image 101. In one case, as illustrated in FIG. 2, the images in the message areas 105 show up and, as a result, the words "COPY" appear in a solid character form. In another case, as illustrated in FIG. 3, the base area 104 shows up and, as a result, the words "COPY" appear in an outline character form.

That is, one of the images in the base area 104 and the message areas 105 is made against copying, and the other one of the images in the base area 104 and the message areas 105 is made susceptible to copying. In the copy of FIG. 2, the image in the base area 104 of the background dot pattern 103 is made against copying and the images in the message areas 105 are made susceptible to copying, so that the image of the base area 104 shows up, i.e., the letters "COPY" appear in the solid form. On the other hand, in the copy of FIG. 3, the image in the base area 104 is made susceptible to copying and the images in the message areas 105 are made against copying, so that the image of the message areas 105 show up, i.e., the letters "COPY" appear in the outline character form.

Figure 4A:
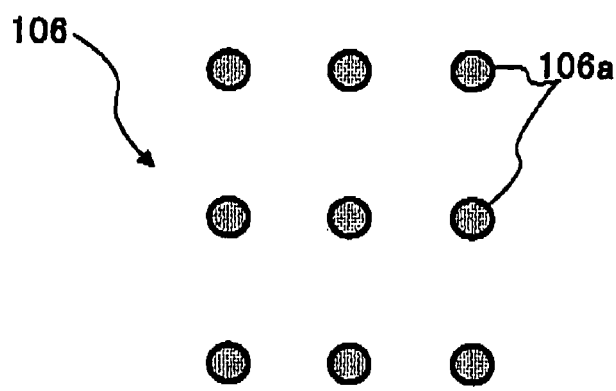
FIGS. 4A and 4B are enlarged illustrations of the background dot pattern of FIG. 3.
Figure 4B:
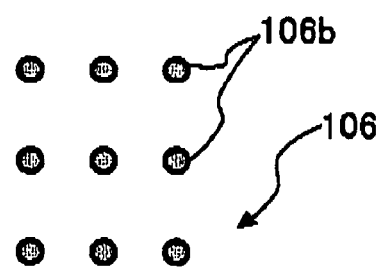
Figure 5A:
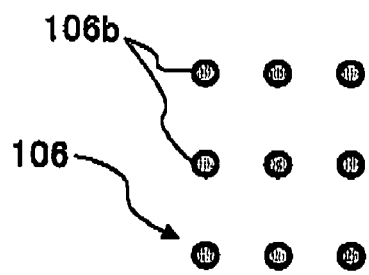
FIGS. 5A and 5B are enlarged illustrations of the background dot pattern of FIG. 2.
Figure 5B:
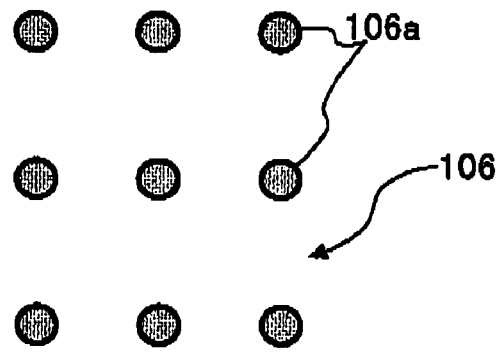

FIGS. 4A and 4B illustrate portions of the base area 104 and the message area 105, respectively, in an enlarged form with respect to the background dot pattern 103 shown in FIG. 3. In contrast to them, FIG. 5A illustrates a portion of the message area 105 and FIG. 5B illustrates a portion of the base area 104. The background dot pattern 103 is made of an aggregation of dots 106 and these dots 106 are classified according to size into groups of dots 106a with a large dot size and dots 106b with a small dot size, as illustrated in FIGS. 4A and 5B and 5A and 5B; the dots 106a have a sufficiently large size to be copied and the dots 106b have an sufficiently small size against copying. That is, in the background dot pattern 103 of FIG. 2, the image in the base area 104 is made of the small-sized dots 106b and the images in the message areas 105 are made of the large-sized dots 106a, as in the case of a combination of FIGS. 5A and 5B, so that the images in the message areas 105 show up and, as a result, the letters "COPY" appear in a solid character form. By contrast, in the background dot pattern 103 of FIG. 3, the image in the base area 104 is made of the large-sized dots 106a and the images in the message areas 105 are made of the small-sized dots 106b, as in the case of a combination of FIGS. 4A and 4B, so that the images in the base area 104 shows up and, as a result, the letters "COPY" appear in an outline character form.

As an alternative to the dots 106, it is possible to use other patterns such as, for example, a thin line pattern, a specific design pattern, and so forth to form the images in the base area 104 and the message areas 105 of the background dot pattern 103.

The present embodiment deals with the base area 104 or the message areas 105 as characteristic quantitative information. For example, when the image showing up is formed of the dots 106, as described above, it is expressed by a characteristic such as a size, a density (i.e., a number of dots per unit area), or the like. When the image showing up is formed of thin lines, it is expressed by a characteristic of a width of the lines, for example. When the image showing up is formed of specific patterns, it can be expressed by a characteristic of the specific pattern, for example.

As an alternative, it is possible to deal with the image in the base area 104 or the message areas 105, which is not shown up, as data expressed as characteristic quantitative information. It is further possible to deal with both of the images in the base area 104 and the message areas 105, which are shown up and not show up, as data expressed in the respective characteristic quantitative information. That is, when at least one of the images in the base area 104 and the message areas 105, which are either embedded in the original sheet 102 or formed during the time the original image 101 is formed, is computer-readable data, these images can be handled as data expressed as the respective characteristic quantitative information when the original image 101 printed on the original sheet 102 is read.

As described above, it is also possible to use a background dot pattern different from the background dot pattern 103 of, for example, FIG. 2. For example, the pattern of the base area 104 or the message areas 105 in the background dot pattern 103 can be used as an alternative background dot pattern. In this case, when the pattern of the base area 104 or the message areas 105, which is either embedded in the original sheet 102 or formed during the time an original image including the pattern is formed, is computer-readable data, the pattern can also be handled as data expressed in the corresponding characteristic quantitative information when the original image printed on the original sheet 102 is read.

Figure 6A:
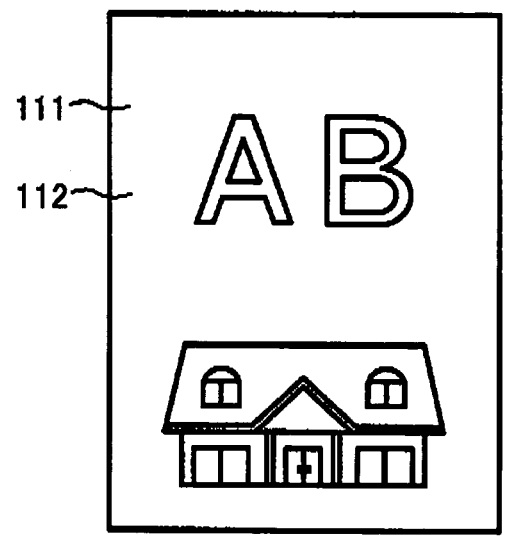
FIGS. 6A and 6B are illustrations of an exemplary expression of another image with a background dot pattern using single-sized dots.
Figure 6B:
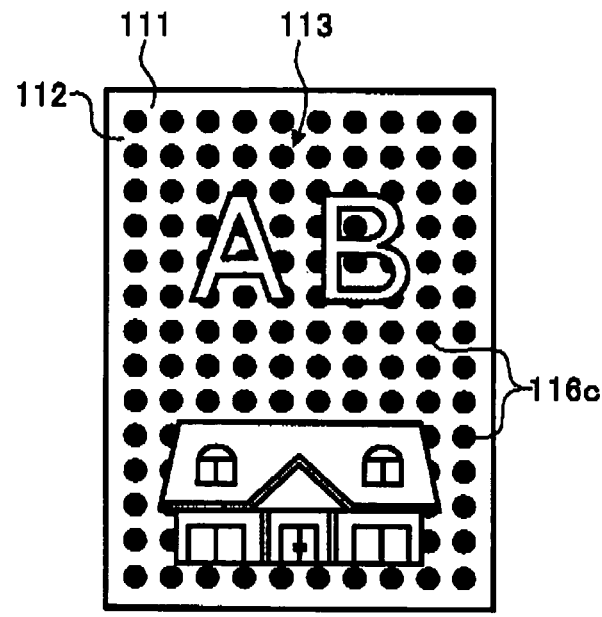
Figure 7A:
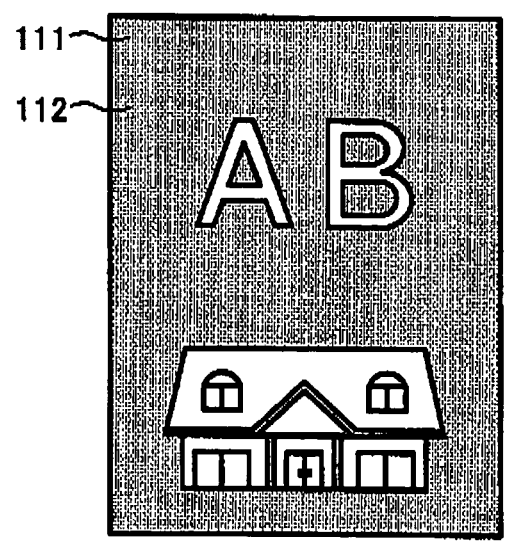
FIGS. 7A and 7B are illustrations of another exemplary expression of the image of FIGS. 6A and 6B.
Figure 7B:
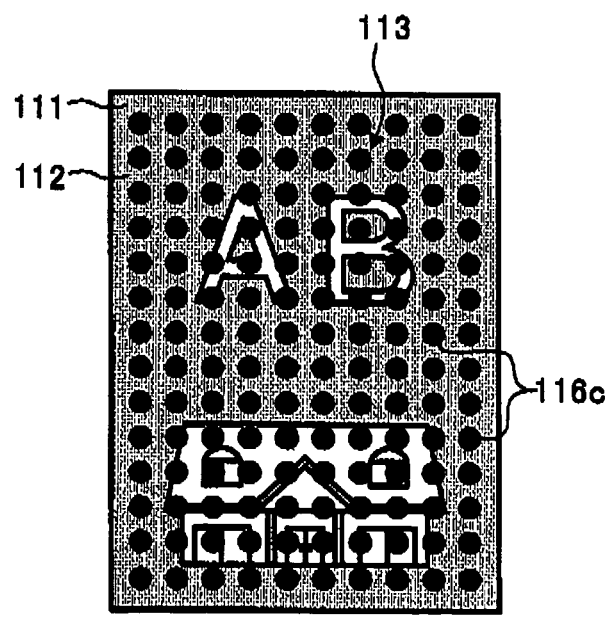

Referring to FIGS. 6A-7B, additional image examples prepared for the layer copy control operation according to the present invention are explained. As shown in both combinations of FIGS. 6A and 6B and FIGS. 7A and 7B, an original sheet 112 has an original image 111 showing letters "AB" and underneath a house. Each of FIGS. 6B and 7B shows a mixed image of the original image 111 and a background dot pattern 113, in which the background dot pattern 113 is made up with a plurality of dots 106c formed in a single dot size. The background dot pattern 113 of FIGS. 6A and 6B can be viewed as a pattern corresponding to that made of the base area 104 alone in the background dot pattern 103 shown in FIGS. 2-5B, and the background dot pattern 113 of FIGS. 7A and 7B can be viewed as a pattern corresponding to that made of the message area 105 alone in the background dot pattern 103 shown in FIGS. 2-5B. Such a background dot pattern 113 can be counted as characteristic quantitative information if the background dot pattern 113 is taken as data when the original image 111 including the background dot pattern 113 is read.

The background dot pattern 113 is drawn as a background image to the original image 111 in the case of FIGS. 6A and 6B and as an overlaying image to the original image 111 in the case of FIGS. 7A and 7B.

The background dot pattern (i.e., the watermark patters 103 and 113) shown in FIGS. 2-7B can represent various kinds of characteristic quantitative information with respect to relationships between the dots 106c constituting the background dot pattern. Among the various kinds of characteristic quantitative information, the present example uses a dot density (i.e., a dot number in a unit area) and a distance between adjacent dots, which are described below.

To determine the dot density of the background dot pattern, a number of dots is counted in a unit area of the focused background dot pattern and is verified with a predetermined threshold value allowing an occurrence of erroneous dot detection or omission to some extent. Based on a resultant dot density, a characteristic quantity of the background dot pattern is determined. Occurrence of erroneous dot detection or omission can easily be made when the threshold value or an allowable range is relatively small, but it will not be easily made when the threshold value or an allowable range is relatively great.

The background dot pattern 113 of FIGS. 6A and 6B has some portions which are hidden under the original image 111; the dots 106c in the hidden portion cannot be detected. The background dot pattern 113 of FIGS. 7A and 7B overlays the original image 111 and has no such portion hidden under the original image 111; however, the dots 106c superimposing with a figure of the original image 111 may not easily be detected. In other words, the detection of dot number depends on the figure of the original image 111. Thus, the instance in which the characteristic quantity is determined based on the dot density may likely allow an occurrence of erroneous dot detection or omission in determining the characteristic quantity even if a predetermined threshold value is given.

Figure 8:
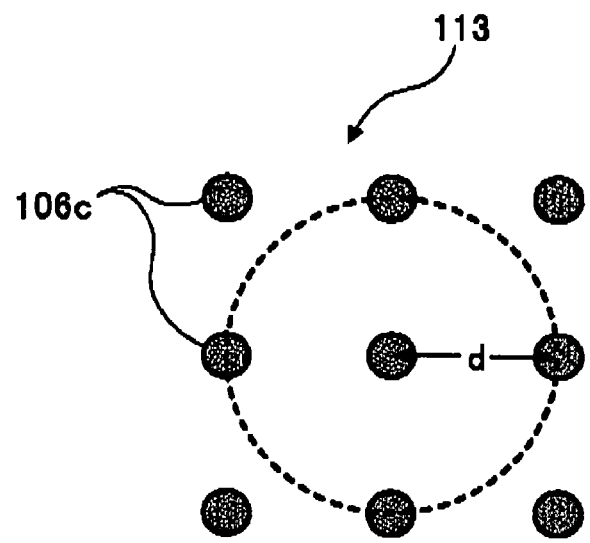
FIG. 8 is an illustration for explaining a dot distance between adjacent two dots.

FIG. 8 illustrates an arbitrary portion of the background dot pattern 113 in which any two adjacent dots 106c are spaced with a predetermined dot distance d. This predetermined dot distance d can represent a characteristic quantity of the background dot pattern 113. In this case of the background dot pattern 113 shown in FIG. 8, the focused dot 106c are surrounded by four other dots with the same predetermined dot distance d. Using this dot distance d, the characteristic quantity of the background dot pattern can properly be detected even if the instance is like those shown in FIGS. 6A-7B. When a plurality of distances between the adjacent dots 106c are measured after the dots 106c are detected from the background dot pattern 113, a relationship between a frequency of appearance and the measured distances d can be represented by a graph of FIG. 9. The graph shows a reverse-V-like shape with the center representing a peak-to-peak (PP) distance (i.e., the predetermined dot distance d) and the top representing a peak value (PV) of a number of occurrences. The reason why the distribution in this graph disperses from the PP distance is that, by taking the instance of FIG. 8, the distances between the four surrounding dots and the focus dot happen to be unequal to the predetermined dot distance d.

Therefore, when the distances between the surrounding dots and the focus dot are measured, the measurement result is also given a predetermined threshold value with respect to the predetermined dot distance d and is verified with it so that the characteristic quantity with respect to the predetermined dot distance d can be determined in a more accurate manner. In this case, as is clear from FIG. 9, occurrence of erroneous dot detection or omission can easily be made when the threshold value or an allowable range is relatively small, but it will not be easily made when the threshold value or an allowable range is relatively great.

Figure 10A:
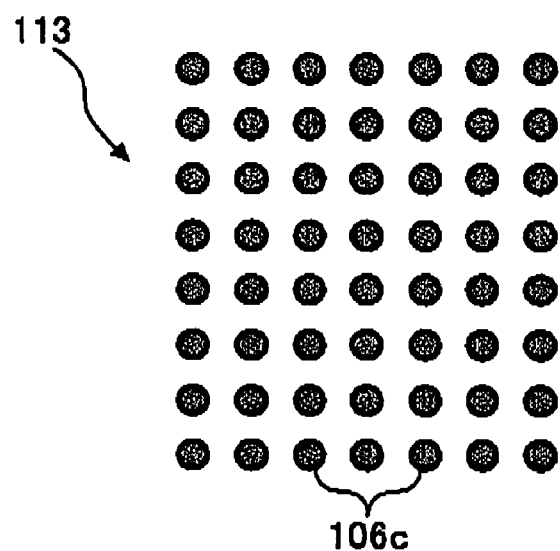
FIGS. 10A and 10B are illustrations for explaining arrangement of dots in a manner that distances between any adjacent two of dots are substantially equal to each other.
Figure 10B:
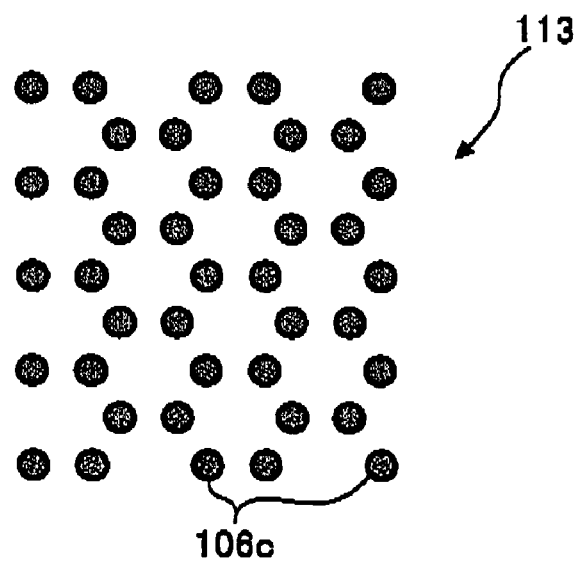

It should be noted, however, that a case in which distances between any two adjacent dots in the background dot pattern 113 are equal to each other, as illustrated in FIG. 10A, can be the case in which the characteristic quantity is determined based on the distances between the surrounding dots and the focused dot. Accordingly, the characteristic quantity can be detected in the case shown in FIG. 10B, in which the background dot pattern 113 has a different dot arrangement from the case of FIG. 10A but the distances between any two adjacent dots in the background dot pattern 113 are equal to each other. For reference sake, the dot density of the background dot pattern 113 of FIG. 10A is different from that shown in FIG. 10B.

Figure 11:
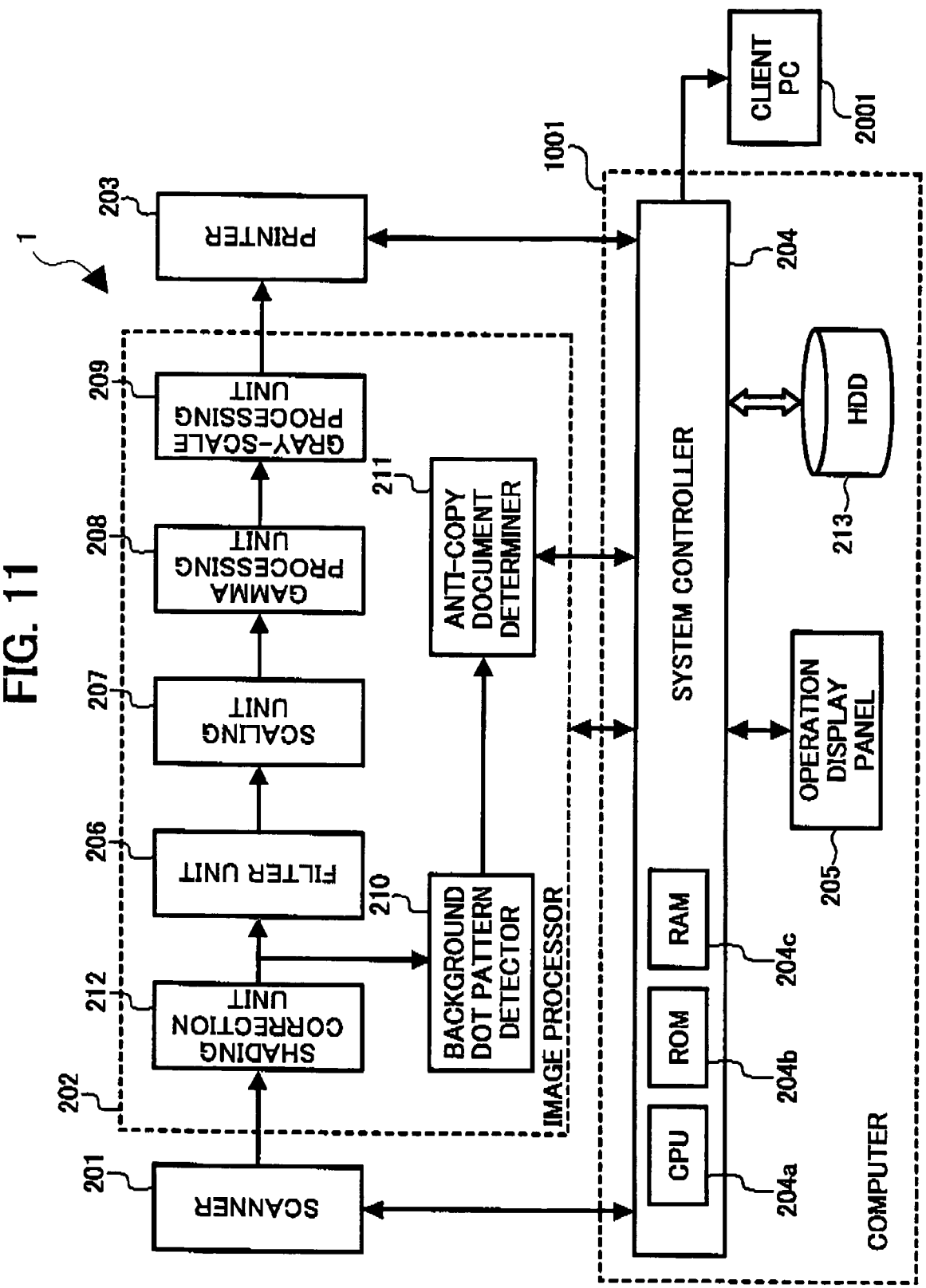
FIG. 11 is a schematic block diagram of an image processing apparatus according to an exemplary embodiment of the present invention.

Next, an image processing apparatus 1 as one example of an embodiment according to the present invention is explained with reference to FIGS. 11-12D. The image processing apparatus 1 of FIG. 11 is configured to perform the copy protection operation with two copy protection systems which differently perform the copy protection operation; a first copy protection system performing the copy protection operation by means of digital circuit and a second copy protection system performing the copy protection operation by means of program installed in a computer.

The first copy protection system detects characteristic quantitative information such as the dot density from the background dot pattern 103 of FIG. 2, for example, and compares the detected characteristic quantitative information with its corresponding reference value stored in the first copy protection system. Based on the comparison, the first copy protection system determines as to whether the detected characteristic information is identical to the corresponding reference value. As one example, this identity determination is conducted with a predetermined threshold value. First, it is determined whether a difference between the detected characteristic quantitative information and the corresponding prestored reference value is smaller than the predetermined threshold value. The detected characteristic quantitative information is determined as identical to the corresponding prestored reference value when the difference is determined as smaller than the corresponding reference value. But, the detected characteristic quantitative information is determined as not identical to the corresponding prestored reference value when the difference is determined as not smaller than the corresponding reference value.

The second copy protection system detects characteristic quantitative information such as the dot density and the dot distance from the background dot pattern 103 of FIG. 2, for example, included in the detected original image 101, and compares the detected characteristic quantitative information with their corresponding reference values stored in the computer. Based on the comparison, the second copy protection system determines as to whether the detected characteristic quantitative information is identical to the corresponding reference value. As one example, this identity determination is conducted with predetermined threshold values for the dot density and the dot distance. First, it is determined whether a difference between the detected characteristic quantitative information and the corresponding prestored reference value is smaller than the predetermined threshold value for each of the dot density and the dot distance. The detected characteristic quantitative information is determined as identical to the corresponding prestored reference value when the difference is determined as smaller than the corresponding reference value. But, the detected characteristic quantitative information is determined as not identical to the corresponding prestored reference value when the difference is determined as not smaller than the corresponding reference value.

The identity determination operations performed by the first and second copy protection systems are different from each other. For example, the first copy protection system is configured to perform an identity determination operation which allows a relatively low number of occurrences of excessively rigorous determinations and a relatively great number of occurrences of erroneous dot detection or omission. In contrast to it, the second copy protection system is configured to perform an identity determination operation which allows a relatively great number of occurrences of excessively rigorous determinations and a relatively small number of occurrences of erroneous dot detection or omission. For another example, the first copy protection system executes the identity determination operation based on the dot density to determine whether the detected dot density is identical to the corresponding reference value. At the same time, the second copy protection system executes the identity determination operation based on the dot density and the dot distance to determine whether the detected dot density and the dot distance are identical to the respectively corresponding reference values.

In this way, the first and second copy protection systems are configured to determine in a different manner the identity of the characteristic quantitative information detected from the background dot pattern 103 to the prestored corresponding reference values, regardless of types of the original image 101. Based on the determination results, the image processing apparatus can determine whether to inhibit an output of image data in accordance with the original image 101.

As described above, the first and second copy protection systems differently execute the identity determination operations; the identity determination operation of the first copy protection system allows a relatively great number of occurrences of excessively rigorous determinations and a relatively small number of occurrences of erroneous dot detection or omission, and the identity determination operation of the second copy protection system allows a relatively great number of occurrences of excessively rigorous determinations and a relatively small number of occurrences of erroneous dot detection or omission. Based on such different characteristics in the identity determination operations, the identity determination operation of the first copy protection system can be performed at a processing speed faster than that of the identity determination operation of the second copy protection system, and the identity determination operation of the second copy protection system can be performed with an accuracy higher than that of the identity determination operation of the first copy protection system.

As also described above, the identity determination operation of the first copy protection system is based on the dot density using the corresponding reference value, and the identity determination operation of the second copy protection system is the dot density and the dot distance using the respectively corresponding reference values. Therefore, the identity determination operation of the first copy protection system tends to allow a relatively small number of occurrences of excessively rigorous determinations and a relatively great number of occurrences of erroneous dot detection or omission, and the identity determination operation of the second copy protection system tends to allow a relatively great number of occurrences of excessively rigorous determinations and a relatively small number of occurrences of erroneous dot detection or omission.

This specification describes an image processing method of the image processing apparatus 1, a computer program product for instructing a computer to perform the operations according to the image processing method, and a computer readable medium storing this computer program product, as well as the image processing apparatus 1.

Referring to FIG. 1-1, an exemplary structure of the first copy protection system implemented in the image processing apparatus 1 is explained. The image processing apparatus 1 shown in FIG. 11 is a digital copying machine which includes a scanner 201, an image processor 202, a printer 203, and a computer 1001. The computer 1001 may be a general personal computer and includes a system controller 204, an operation display panel 205, and a hard disc drive (HDD) 213. The system controller 204 includes a CPU (central processing unit) 204a, a ROM (read only memory) 204b, and a RAM (random access memory) 204c. By using computing functions achieved with these components, the system controller 204 controls the entire operations of the scanner 201, the image processor 202, and the printer 203 according to the instructions input through the operation display panel 205, displays information on the operation display panel 205, and stores the information into the hard disc drive 213 on an as needed basis. The image processing apparatus 1 is connected with a client PC (personal computer) 2001 to communicate with each other.

As described above, the image processing apparatus 1 of FIG. 11 is provided with the first and second copy protection systems. The first copy protection system performs a first copy protection operation including a first group of job steps with the image processor 202, and the second copy protection system performs a second copy protection operation including a second group of job steps according to a program installed in the computer 1001.

The first copy protection operation performed by the first copy protection system is explained with reference to FIGS. 11-12D. In FIG. 11, one exemplary structure of the image processor 202 is illustrated. The image processor 202 of FIG. 11 includes a shading correction unit 212, a filter unit 206, a scaling unit 207, a gamma processing unit 208, a gray-scale processing unit 209, a background dot pattern detector 210, and an anti-copy document determiner 211. Amongst these components, the shading correction unit 212, the filter unit 206, the scaling unit 207, the gamma processing unit 208, and the gray-scale processing unit 209 are similar to those generally used in an ordinary digital copying machine and therefore an explanation for these components are omitted.

The background dot pattern detector 210 and the anti-copy document determiner 211 of the image processor 202 are hardware resources including digital circuits for detecting and determining a copy-prohibited document such as the contract sheet 100 of FIG. 1, and prohibiting its duplication.

In this example, the background dot pattern detector 210 performs job steps for detecting the dot density, for example, as a characteristic quantity from the background dot pattern 103 included in the original image 101, comparing the detected dot density with a reference value (explained below) prestored in a memory, and determining whether the detected dot density is identical to the reference value.

Figure 12A:
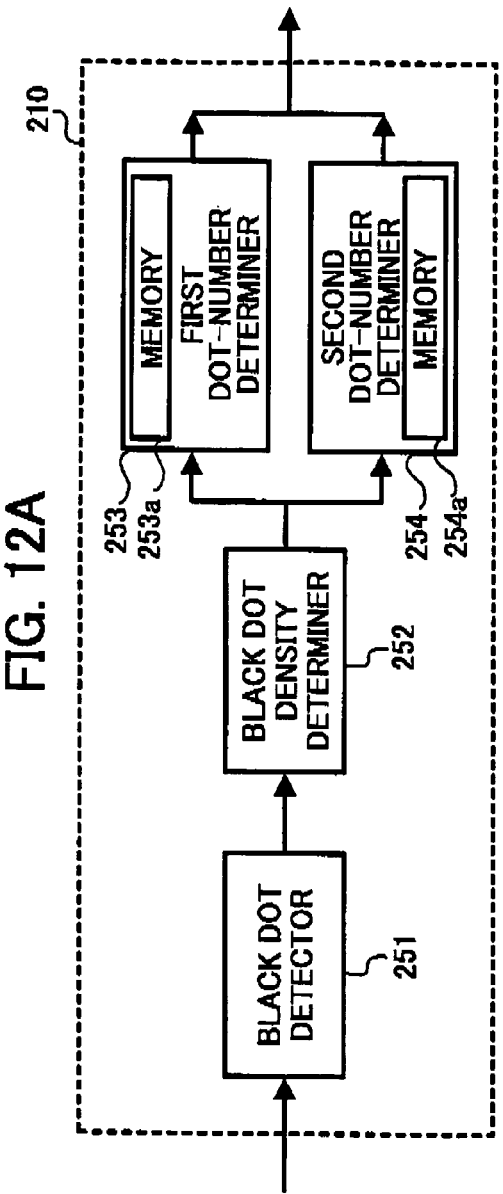

To perform the above-mentioned job steps, the background dot pattern detector 210 has an exemplary hardware structure as illustrated in FIG. 12A, including a black dot detector 251, a black dot density determiner 252, a base area dot-number determiner 253, and a message area dot-number determiner 254. The base area dot-number determiner 253 includes a memory 253a, and the message area dot-number determiner 254 includes a memory 254a. The black dot detector 251 detects the dots 106 from the image data generated based on the readings of the original image 101 by the scanner 201. An actual method of the detection is selected from among various known techniques for detecting image patterns with digital circuits, such as a pattern matching technique, for example. After the detection of the dots 106, the black dot density determiner 252 calculates a dot density within a specific area with respect to the dots 106 detected by the black dot detector 251. This calculation can be performed using digital counters, adders, and so on.

In the background dot pattern detector 210, the base area dot-number determiner 253 and the message area dot-number determiner 254 are arranged following the black dot density determiner 252. The memory 253a of the base area dot-number determiner 253 stores a first-type reference base-area dot-density and a first-type reference base-area dot-number. The memory 253a of the base area dot-number determiner 253 further stores a first-type base-area dot-density threshold value to be used as a permissible value in the identity determination relative to a dot density in a specific unit area of the base area 104 in the background dot pattern 103 prepared as the background anti-copy dot pattern. The base-area dot-density threshold value is used for the identity determination with respect to the detected dot density after the comparison between the detected dot density and the reference base area dot density is made. Based on this first-type base-area dot-density threshold value, the black dot density determiner 252 performs the dot density calculation. The memory 253a of the base area dot-number determiner 253 also stores a first-type base-area dot-number threshold value to be used as a permissible value in the identity determination relative to a dot number in a specific unit area of the base area 104 in the reference background dot pattern 103 indicating the anti-copy mark which is included in the original sheet 102.

The memory 254a of the message area dot-number determiner 254 stores a first-type reference message-area dot-density and a first-type reference message-area dot-number. The memory 254a of the message area dot-number determiner 254 further stores a first-type message-area dot-density threshold value to be used as a permissible value in the identity determination relative to a dot density in a specific unit area of the message area 105 in the reference background dot pattern 103 prepared as the background anti-copy dot pattern. Based on this first-type message-area dot-density threshold value, the black dot density determiner 252 performs the dot density calculation. The memory 254a of the second dot-number determiner 254 also stores a first-type message-area dot-number threshold value to be used as a permissible value in the identity determination relative to a dot number in a specific unit area of the message area 105 in the reference background dot pattern 103 indicating the anti-copy mark which is included in the original sheet 102.

The first dot-number determiner 253 accumulates the number of dots 106 in a counter (not shown), for example, which are determined as the identical size, i.e., the dots 106a or the dots 106b, by the black dot detector 251, when determining that the density of dots 106 calculated by the black dot density determiner 252 is within a specific range determined by the corresponding first-type reference base-area dot-density and the first-type base-area dot-density threshold value with respect to the dot density stored in the memory 253a. The first dot-number determiner 253 then determines that the base area 104 of the anti-copy background dot pattern 103 exists when the accumulated dot number is checked out as within the specific range determined by the corresponding first-type reference base-area dot-number and the first-type base-area dot-number threshold value with respect to the dot number stored in the memory 253a. The first dot-number determiner 253 transmits the determination result to the anti-copy document determiner 211.

The second dot-number determiner 254 accumulates the number of dots 106 in a counter (not shown), for example, which is determined as the identical size, i.e., the dots 106a or the dots 106b, by the black dot detector 251, when determining that the density of dots 106 calculated by the black dot density determiner 252 is within a specific range determined by the first-type corresponding reference message-area dot-density and the first-type message-area dot-density threshold value with respect to the dot density stored in the memory 254a. The second dot-number determiner 254 then determines that the message area 105 of the anti-copy background dot pattern 103 exists when the accumulated dot number is within the specific range determined by the corresponding first-type reference message-area dot-number and the first-type message-area dot-number threshold value with respect to the dot number stored in the memory 254a. The second dot-number determiner 254 transmits the determination result to the anti-copy document determiner 211.

Upon receiving the determination result from the background dot pattern detector 210, the anti-copy document determiner 211 performs the determination process for determining whether the present document is a copy-prohibited document with reference to a predefined standard. This predefined standard can be, for example, established by being input as parameters through the operation display panel 205 and stored in a memory area (not shown) of the anti-copy document determiner 211. For example, the anti-copy document determiner 211 determines that the present document is a copy-prohibited document like a confidential document when determining that one of the base area 104 and the message area 105 of the background dot pattern 103 exists in the original image 101 read by the scanner 201. For another example, the anti-copy document determiner 211 determines that the present document is a copy-prohibited document like a confidential document when determining that both of the base area 104 and the message area 105 of the background dot pattern 103 exist in the original image 101 read by the scanner 201.

Figure 12B:
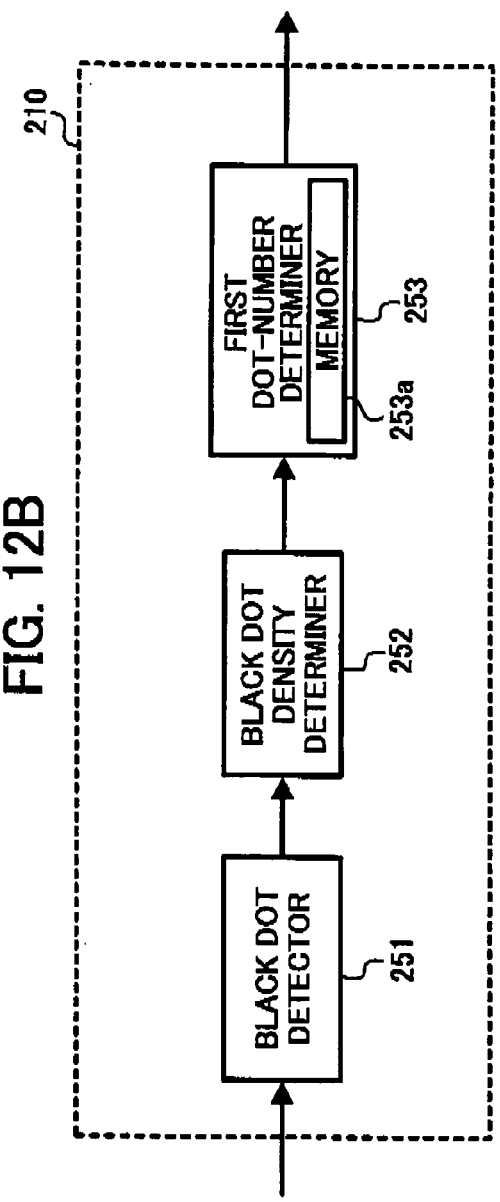

When the anti-copy document determiner 211 is set to the condition for determining that the present document is a copy-prohibited document when one of the base area 104 and the message area 105 of the background dot pattern 103 is determined as existing in the original image 101, there is no need to provide both of the first dot-number determiner 253 and the second dot-number determiner 254 but one of the two, after the black dot density determiner 252 in the background dot pattern detector 210. For example, when the base area 104 is used and the message area 105 is not used for the anti-copy document determining condition, it is necessary that the background dot pattern detector 210 includes the first dot-number determiner 253 but not the second dot-number determiner 254, as shown in FIG. 12B. As an alternative, when the message area 105 is used and the base area 104 is not used for the anti-copy document determining condition, it is necessary that the background dot pattern detector 210 includes the second dot-number determiner 254 but not the first dot-number determiner 253, as shown in FIG. 12C.

Further, to determine whether the original image 111 having the background dot pattern 113 made solely of the dots 106c, as shown in FIGS. 6A-7B, there is no need to provide both of the first dot-number determiner 253 and the second dot-number determiner 254 but simply need to provide a dot number determiner 255, after the black dot density determiner 252 in the background dot pattern detector 210. The dot number determiner 255 includes a memory 255a which stores a first-type reference dot density and a first-type reference dot number. The memory 253a of the base area dot-number determiner 253 further stores a first-type dot-density threshold value to be used as a permissible value in the identity determination relative to a dot density in a specific unit area of the base area 104 in the background dot pattern 113 prepared as the background anti-copy dot pattern. The dot-density threshold value is used for the identity determination with respect to the detected dot density after the comparison between the detected dot density and the reference dot density is made. Based on this first-type dot-density threshold value, the black dot density determiner 252 performs the dot density calculation. The memory 253a of the base area dot-number determiner 253 also stores a first-type dot-number threshold value to be used as a permissible value in the identity determination relative to a dot number in a specific unit area of the base area 104 in the reference background dot pattern 113 indicating the anti-copy mark which is included in the original sheet 102.

The dot-number determiner 255 accumulates in a counter (not shown) the number of dots 106c in an identical size detected by the black dot detector 251 when determining that the density of dots 106c calculated by the black dot density determiner 252 is within the specific range determined by the corresponding first-type reference dot-density and the first-type dot-density threshold value with respect to the dot density stored in the memory 255a. The dot-number determiner 255 then determines that the original image includes the anti-copy background dot pattern 113 when the accumulated dot number is within the specific range determined by the corresponding first-type reference dot-number and the first-type dot-number threshold value with respect to the dot number stored in the memory 255a. But, the dot-number determiner 255 determines that the original image does not include the anti-copy background dot pattern 113 when the accumulated dot number is not within the specific range determined by the corresponding first-type reference dot-number and the first-type dot-number threshold value with respect to the dot number stored in the memory 255a. After that, the dot-number determiner 255 transmits the determination result to the anti-copy document determiner 211.

Thus, the present embodiment detects from the image data the background dot pattern 103 embedded in the background image which is included in the image data of the original image 101. Then, the present embodiment compares the detected background dot pattern 103 to the prestored reference anti-copy background dot pattern, thereby performing the background dot pattern identity determination. With this operation, the present embodiment can determine whether it is permissible to output the image data of the original image 101, regardless of the types of the original image.

The anti-copy document determiner 211 performs, as described above, the determination process for determining whether the detected characteristic quantity or the detected dot density is identical to the first-type reference dot-density. That is, upon receiving the determination result from the background dot pattern detector 210, the anti-copy document determiner 211 performs the determination process for determining whether the present document is a copy-prohibited document with reference to a predefined standard. This predefined standard can be, for example, established by being input as parameters through the operation display panel 205 and stored in a memory area (not shown) of the anti-copy document determiner 211. For example, the anti-copy document determiner 211 determines that the present document is a copy-prohibited document like a confidential document when a determination that the background dot pattern 103 exists in the original image 101 is sent from the dot-number determiner 255.

As discussed above on the first and second dot-number determiners 253 and 254 and the dot-number determiner 255 and the anti-copy document determiner 211, the image processor 202 thus structured with the digital circuits performs the job steps of detection, comparison, and determination which correspond to the first copy protection operation by the first copy protection system, described above. In the detection process, the anti-copy document determiner 211 detects the background dot pattern 103, for example, in the background image included in the image data of the original image 101, for example. In the comparison process, the anti-copy document determiner 211 compares the dot density which is the character quantity of the detected background dot pattern 103, for example, with the characteristic quantity of the copy-protected document dot pattern stored in the memory 253a. In the determination process, the anti-copy document determiner 211 determines the identity between the two compared. Thereby, regardless of images, the embodiment of the present invention can determine whether to prohibit an output of image data with respect to the original image 101, for example, by determining whether the detected dot pattern 103, for example, is identical to the dot pattern stored in the memory 253a.

When the anti-copy document determiner 211 determines that the original image 101, for example, read by the scanner 201 is a copy-prohibited document, it transmits information indicating that a copy-prohibited document is detected to the system controller 204. In response to the information, the system controller 204 enters a process for prohibiting the reproduction operation of the printer 203 with respect to the copy-prohibited document so determined by the system controller 204. That is, the system controller 204 performs the reproduction prohibition process for the copy-prohibited document upon determining the detected dot pattern 103, for example, is identical to the dot pattern stored in the memory 253a. With this configuration, the original image 101 read by the scanner 201 is prohibited from reproduction if it is a copy-prohibited document such as a confidential document.

When the original image 101 read by the scanner 201 is determined as not a copy-prohibited document like a confidential document, the image processing apparatus 1 performs an ordinary reproduction operation. More specifically, the image data of the original image 101 read by the scanner 201 is processed through the image processor 202 and the resultant image data are reproduced into an image by the printer 203.

The above-described copy prohibition is one exemplary way of prohibiting an output of a copy-prohibited document. As an alternative, particularly in a system in which a scanned document, even a copy-prohibited document, can easily be distributed through e-mail, facsimile transmission, data transmission, etc., the copy prohibition can be achieved by banning a distribution of the original image 101, for example, scanned by the scanner 201 when a document is determined as a copy-prohibited document in the way as described above.

Figure 13:
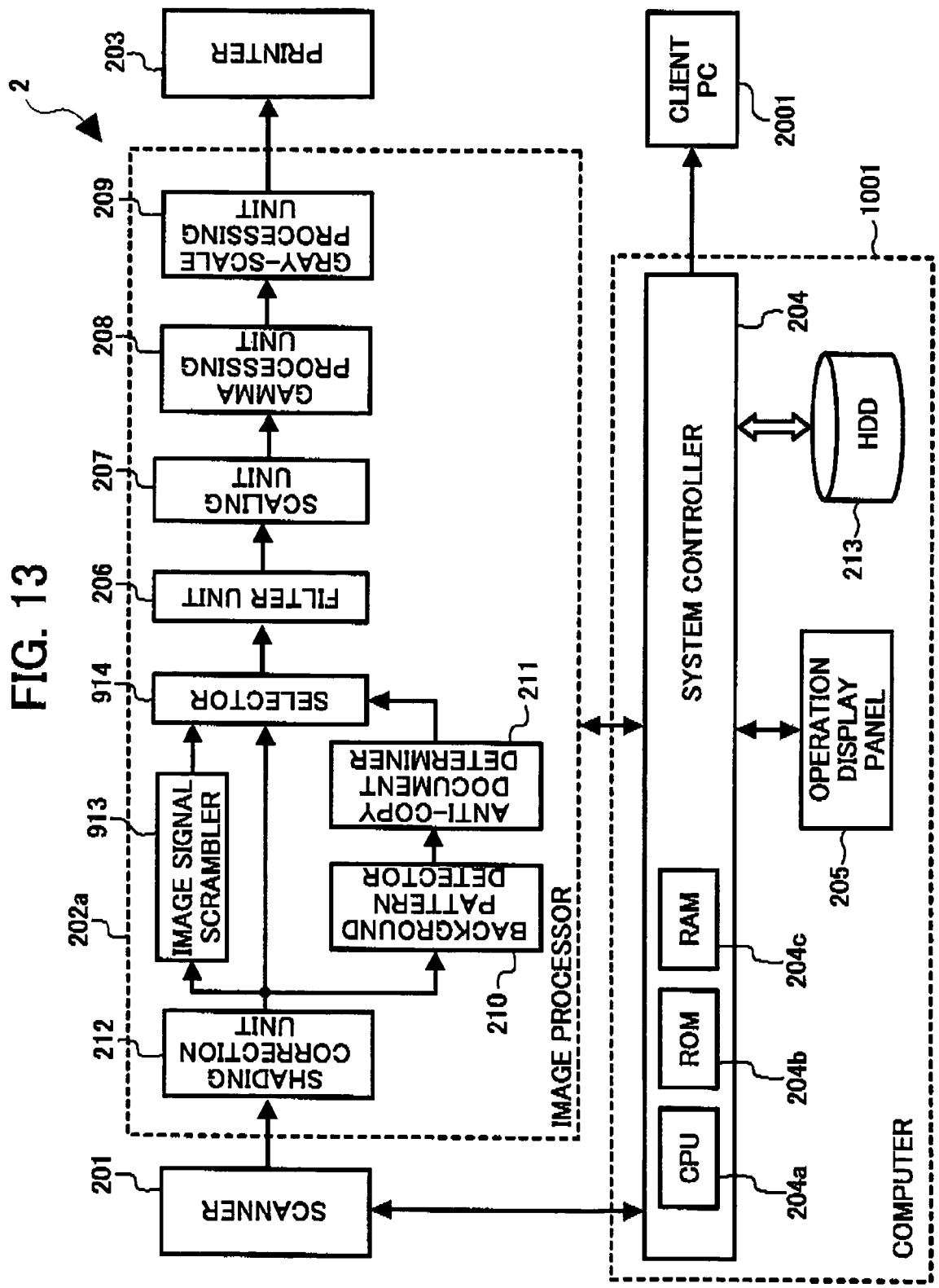
FIG. 13 is a schematic block diagram of an image processing apparatus according to another preferred embodiment of the present invention.

Next, the first copy protection system of an image processing apparatus 2 according to another exemplary embodiment of the present invention is explained with reference to FIG. 13. As shown in FIG. 13, the image processing apparatus 2 is a digital copying machine and similar to the image processing apparatus 1 of FIG. 11, except for an image processor 202a which is based on, with a slight modification, the image processor 202. A difference between the image processor 202a from the image processor 202 is an image signal scrambler 913 and a selector 914.

The background dot pattern detector 210, the anti-copy document determiner 211, the image signal scrambler 913, and the selector 914 of the image processor 202 are hardware resources including digital circuits for detecting and determining a copy-prohibited document such as the contract sheet 100 of FIG. 1 and prohibiting duplication of such sheet. In this case, the image processing apparatus 2 scrambles an image signal of the read copy-prohibited document so that the read copy-prohibited document can be reproduced into a nonreadable copy.

In parallel to the anti-copy document determination performed by the background dot pattern detector 210 and the anti-copy document determiner 211, the image signal scrambler 913 receives the image signal from the shading correction unit 212. The image signal sent from the shading correction unit 212 is an image signal read by the scanner 901 and is shaded by the shading correction unit 912. Upon receiving the shaded image signal, the image signal scrambler 913 scrambles this shaded image signal so that a reproduced output of the present copy-prohibited document from the printer 203 becomes a nonreadable image.

When the anti-copy document determiner 211 determines that the original image 101 read by the scanner 201 is a copy-prohibited document, it transmits information indicating that a copy-prohibited document is detected to the selector 914 of the image processor 202 but not to the system controller 204 as does the image processing apparatus 1. The selector 914 usually selects the image signal straight from the shading correction unit 212 unless it receives the information from the selector 914 indicating that a copy-prohibited document is detected. However, upon receiving the information, the selector 914 selects the image signal output from the image signal scrambler 913 instead of selecting the image signal straight from the shading correction unit 212. As a result, the selector 914 outputs the scrambled image signal to the subsequent image processing circuits, instead of outputting the shaded image signal based on the original image 101 read by the scanner 201. Accordingly, when the original image 101 read by the scanner 201 is a copy-prohibited document such as a confidential document, a straight reproduction is prohibited; instead a scrambled image is output.

The image signal scrambling by the image signal scrambler 913 may, for example, change values of pixels included in the image signal to a predetermined pixel value so that the image is filled in with a specific color (e.g., a white, gray, or black color) determined by the predetermined pixel value. As an alternative, the image signal scrambler 913 may add a repetitive pattern signal to the image signal to make the image signal illegible.

The above-described copy prohibition is one exemplary way of prohibiting an output of a copy-prohibited document by making the copy-prohibited document illegible with an addition of scrambling images to the copy-prohibited document. As an alternative, particularly in a system in which a scanned document, even a copy-prohibited document, can easily be distributed through e-mail, facsimile transmission, data transmission, etc., the copy prohibition can be achieved by banning a distribution of the original image 101, for example, scanned by the scanner 201 when a document is determined as a copy-prohibited document in the way as described above.

Next, the second copy protection system exemplarily implemented in the image processing apparatus 1 according to another exemplary embodiment of the present invention is explained with reference to FIGS. 14-16. The second copy protection system can also be implemented in the image processing apparatus 2 of FIG. 13.

Figure 14:
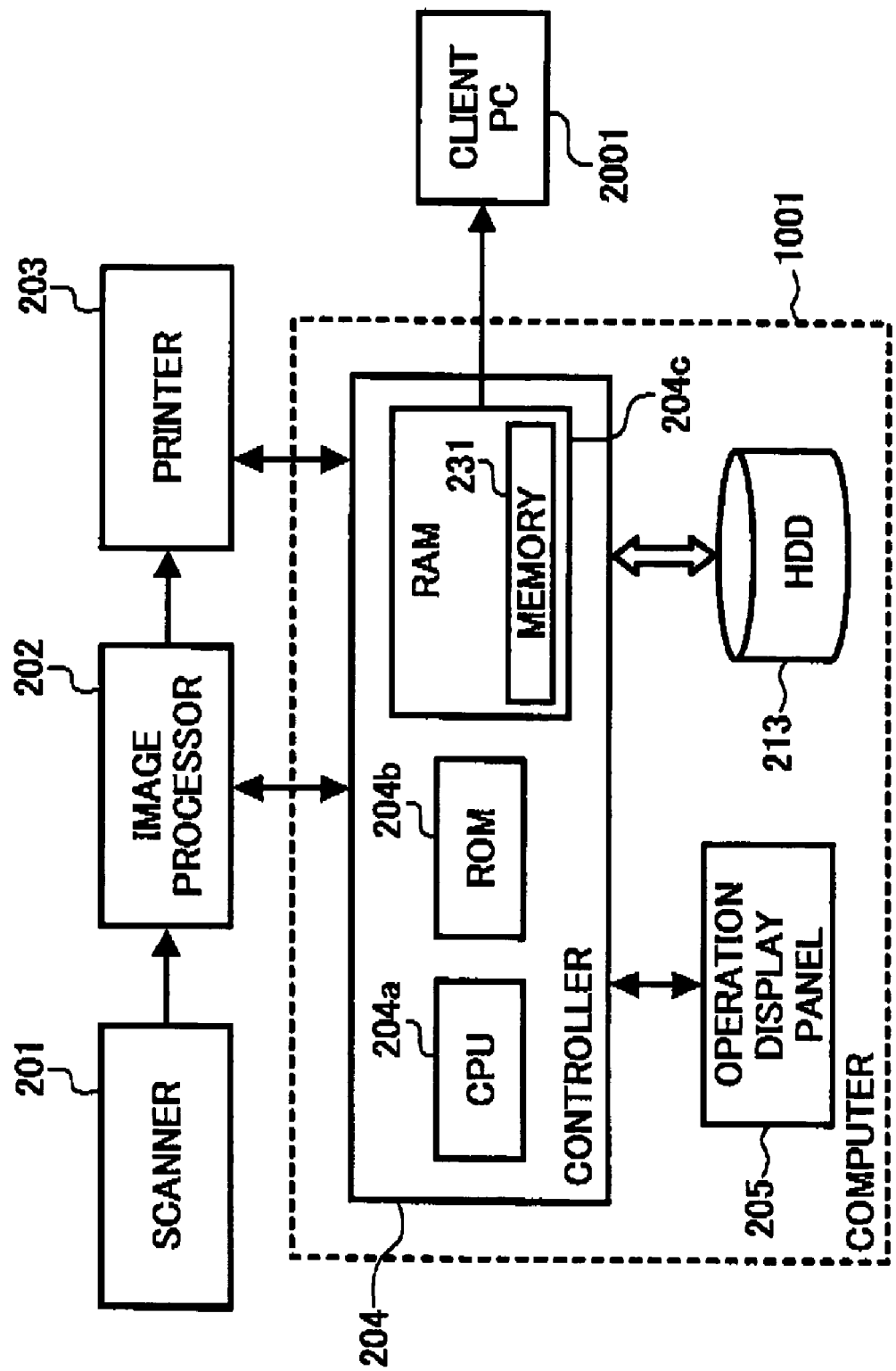
FIG. 14 is a schematic block diagram of the image processing apparatus of FIG. 11 for explaining a first copy protection system running on a hardware resource and a second copy protection system running on a program.

In the second copy protection system of the image processing apparatus 1 of FIG. 14, a computer program for the second copy protection operation is installed as a firmware in the ROM 204b of the system controller 204, to perform its second group of job steps for detecting and determining a copy-prohibited document such as the contract sheet 100 of FIG. 1 and, upon a detection of such a copy-prohibited document, instructing the computer 1001 to perform the copy protection operation so as to prohibit duplication of such sheet.

As an alternative, such computer program for the copy protection may be installed in the hard disc drive 213 connected to a micro computer configured by the CPU 204a, the ROM 204b, and the RAM 204c. In this case, upon the time the image processing apparatus 1 is powered, the computer program prestored in the hard disk drive 213 is loaded to the RAM 204c and the computer program loaded in the RAM 204c is subsequently activated. Then, the computer program for the copy protection installed as a firmware in the RAM 204c of the system controller 204 performs the second group of job steps included in the program of the second copy protection system for detecting and determining a copy-protected document such as the contract sheet 100 of FIG. 1 and, upon detection and determination of such a copy-protected document, instructing the system controller 204 of the computer 1001 to perform the copy protection operation so as to prohibit duplication of such sheet. In this alternative configuration, the RAM 204c or the hard disc drive 213 functions as a memory medium for storing a computer program as a firmware.

As described above, one of the common features of the image processing apparatuses 1 and 2 is that the apparatuses are provided with the first and second copy protection systems and that the identity determination operations performed by the first and second copy protection systems are different from each other in order to determine whether the detected characteristic quantity is identical to a corresponding reference value. In this configuration, the first copy protection system performs an identity determination operation which allows a relatively low number of occurrences of excessively rigorous determinations and a relatively great number of occurrences of erroneous dot detection or omission. On the other hands, the second copy protection system performs an identity determination operation which allows a relatively great number of occurrences of excessively rigorous determinations and a relatively small number of occurrences of erroneous dot detection or omission. As an alternative, the first copy protection system executes the identity determination operation based on the dot density to determine whether the detected dot density is identical to a corresponding second-type reference dot density value. At the same time, the second copy protection system executes the identity determination operation based on the dot density and the dot distance to determine whether the detected dot density and the dot distance are identical to respectively corresponding second-type reference dot density and dot distance values.

Figure 15:
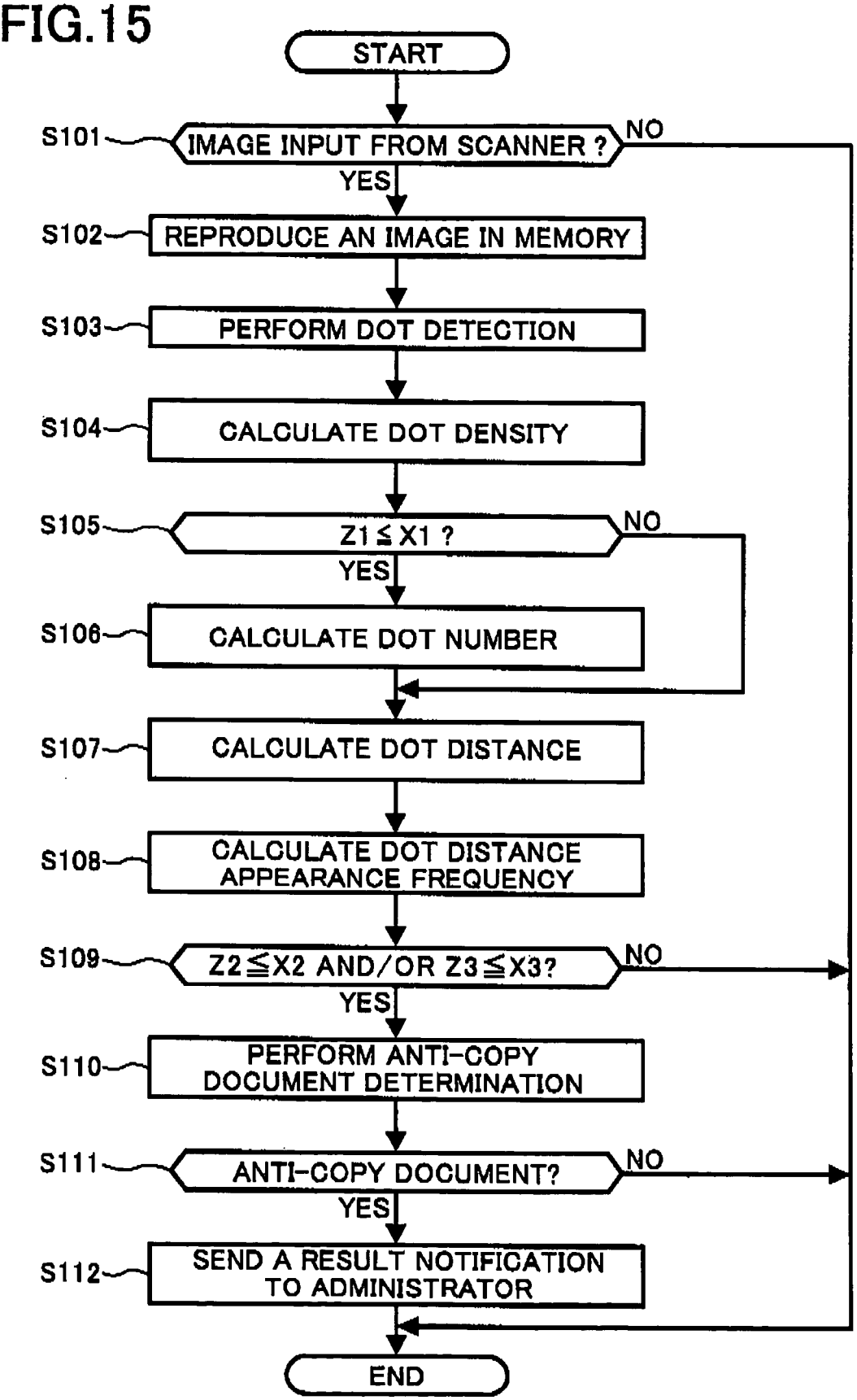
FIG. 15 is a flowchart of an exemplary procedure of a second copy protection operation performed by the image processing apparatus of FIG. 14.

Referring to FIG. 15, an exemplary procedure of the second copy protection operation performed in accordance with the computer program stored in the image processing apparatus 1 is explained. In Step S101 of FIG. 10, the CPU 204a of the system controller 204 repeatedly checks whether image data read from the original image 101 by the scanner 201 is input to the image processor 202. This check operation is repeatedly performed at predetermined time intervals until the CPU 204a determines an event that image data is input. Upon a time the CPU 204a determines an event that image data is input and the check result of Step S101 becomes YES, the CPU 204a stores the input image data into an image memory area included in the RAM 204c, in Step S102. Then, in Step S103, the CPU 204a detects the dots 106 from the input image data stored in the image memory of the RAM 204c. An actual detection method may be one of various conventional methods for detecting images such as a pattern matching method. Then, in Step S104, the CPU 204a calculates a dot density in a specific unit area of the detected dots 106.

In this embodiment, the RAM 204c includes a memory 231 which is one of a nonvolatile memory and a battery-backed-up memory to store data including a plurality of data sets for determining a dot density and a distance between dots. One of the plurality of data sets for determining a dot density includes a second-type reference dot-density value set and a second-type dot-density threshold value set based on which an identity determination is performed on a dot density in a specific unit area in the detected background dot pattern 103 included in the original sheet 102. Another one of the plurality of data sets for determining a dot number includes a second-type reference dot-number value set and a second-type dot-number threshold value set based on which an identity determination is performed on a dot number in a specific unit area in the detected background dot pattern 103 included in the original sheet 102. Another one of the plurality of data sets for determining a dot distance includes a second-type reference dot-distance value set and a second-type dot-distance threshold value set for a peak position and a peak value with respect to an appearance frequency of dot distances, based on which an identity determination is performed with respect to the dot distances.

More specifically, in order to handle the copy-protected document shown in FIG. 2, for example, in which the background dot pattern 103 includes the base area 104 and the message area pattern 105, various data sets are stored in the memory 231, including a dot-density data set, a dot-number data set, and a dot-distance data set. The dot-density data set and the dot-number data set are used to calculate a dot density in a specific area of the detected dots 106. The dot-distance data set is used to calculate a distance between dots. The dot-density data set includes a second-type reference base-area dot-density value and a second-type base-area dot-density threshold value, based on which an identity determination is performed on a dot density in a specific unit area of the base area 104 in the detected background dot pattern 103. The dot-number data set includes a second-type reference base-area dot-number value and a second-type base-area dot-number threshold value, based on which an identity determination is performed on a dot number in a specific unit area of the base area 104 in the detected background dot pattern 103 included in the original sheet 102. The dot-distance data set includes a second-type reference base-area dot-distance value and a second-type dot-distance threshold value for a peak position and a peak value with respect to an appearance frequency of distances of dots in the base area 104, based on which an identity determination is performed with respect to the dot distances. The dot-density data set further includes a second-type reference message-area dot-density value and a second-type message-area dot-density threshold value, based on which an identity determination is performed on a dot density in a specific unit area of the base area 104 in the detected background dot pattern 103. The dot-number data set further includes a second-type reference message-area dot-number value and a second-type message-area dot-number threshold value, based on which an identity determination is performed on a dot number in a specific unit area of the base area 104 in the detected background dot pattern 103 included in the original sheet 102. The dot-distance data set further includes a second-type reference message-area dot-distance value and a second-type dot-distance threshold value for a peak position and a peak value with respect to an appearance frequency of distances of dots in the base area 104, based on which an identity determination is performed with respect to the dot distances.

Further, in order to handle the copy-protected document shown in FIGS. 6A-7B, for example, in which the background dot pattern 113 is made up solely with a single-sized dot (i.e., the dots 106c), various data sets are stored in the memory 231, including a dot-density data set, a dot-number data set, and a dot-distance data set. In this case, the dot-density data set includes a second-type reference dot-density value and a second-type dot-density threshold value, based on which an identity determination is performed on a dot density in a specific unit area in the detected background dot pattern 103. The dot-number data set includes a second-type reference dot-number value and a second-type dot-number threshold value, based on which an identity determination is performed on a dot number in a specific unit area in the detected background dot pattern 103 included in the original sheet 102. The dot-distance data set includes a second-type reference dot-distance value and a second-type dot-distance threshold value for a peak position and a peak value with respect to an appearance frequency of distances of dots, based on which an identity determination is performed with respect to the dot distances.

In Step S105, the CPU 204a determines whether a dot density Z1 in a specific unit area of the dots 106 detected in Step S104 is within a range X1 determined by the corresponding second-type reference dot density and the second-type dot density threshold value, stored in the memory 231 of the RAM 204c, with respect to the dot density of the corresponding background dot pattern of the copy-protected document. This threshold value represents one of the second-type base-area dot-density threshold value of the base area 104 in the background dot pattern 103, the second-type message-area dot-density threshold value of the message area 105 in the background dot pattern 103, and the second-type dot-density threshold value in the background dot pattern 113.

When the CPU 204a determines that the dot density Z1 in a specific unit area of the dots 106 detected in Step S104 is within the range X1 determined by the corresponding second-type reference dot density and the second-type dot density threshold value and the determination result of Step S105 becomes YES, the CPU 204a performs a dot number calculation to accumulate the dot number of the detected dots 106, in Step S106. As a result of the accumulation, an accumulated dot number Z2 is generated and is accumulated in a registration memory area of the RAM 204c, for example. When the CPU 204a determines that the dot density Z1 in a specific unit area of the dots 106 detected in Step S104 is not within the range X1 determined by the corresponding second-type reference dot density and the second-type dot density threshold value and the determination result of Step S105 becomes NO, the process proceeds to Step S107. This negative result from the identity determination in Step S105 represents a case in which the CPU 204a determines the dot density detected as the characteristic quantity of the original image 101 as not identical to the characteristic quantity of the background dot pattern in the copy-protected document. On the other hand, the accumulated dot number Z2 calculated and accumulated in the registration area of the RAM 204a in Step S106 is used in Step S109 for the identity determination as to whether the dot density detected as the characteristic quantity of the original image 101 is identical to the characteristic quantity of the background dot pattern in the copy-protected document. Accordingly, the process of Step S106 is not needed and is therefore skipped when the CPU 204a determines that the dot density Z1 in a specific unit area of the dots 106 detected in Step S104 is not in the range X1 determined by the corresponding second-type reference dot density and the second-type dot density threshold value and the determination result of Step S105 becomes NO, that is, when the dot density detected as the characteristic quantity of the original image 101 is determined as not identical to the characteristic quantity of the background dot pattern in the copy-protected document.

Processes of Steps S107 and S108 and subsequent processes through to Steps S111 are those to determine, with respect to the characteristic quantity as dot distance, whether the dot density detected as the characteristic quantity of the original image 101 is identical to the characteristic quantity of the background dot pattern in the copy-protected document.

That is, this embodiment of the present invention uses two characteristic quantities of dot density and dot distance to determine whether the dot density detected as the characteristic quantity of the original image 101 is identical to the characteristic quantity of the background dot pattern in the copy-protected document.

In Step S107, the CPU 204a performs the calculation of the dot distance d between two adjacent dots 106 included in the detected background dot pattern 103. For example, the CPU 204a seeks coordinates of the centers of the two adjacent dots 106 and a distance between the positions represented by the coordinates sought, thereby obtaining the dot distance d. In Step S107, the CPU 204a calculates a plurality of sets of two adjacent dots 106 to obtain a plurality of dot distances d and stores them into the registration memory area of the RAM 204c, for example.

In Step S108, the CPU 204a performs the calculation of an appearance frequency of the dot distance d. For example, the CPU 204a calculates a peak value (i.e., the peak value PV) and a peak position (i.e., the peak position PP) based on the dot distances d calculated in Step S107 and regards a resultant figure as the appearance frequency of the dot distances d. As apparent from the graph of FIG. 9, the peak position PP obtained based on the plurality of dot distances d is assumed to represent an actual dot distance d with respect to the plurality of dots 106 detected in Step S103. The peak value PV indicates a degree of concentration of the dots 106 detected in Step S103 at the peak position PP. In the case of the background dot pattern 113 of FIG. 10A or 10B, the appearance frequency of dot distance with respect to the plurality of dots 106c which are detected in Step S103 can be expressed by the graph of FIG. 9. In this case, the peak value PV of the appearance frequency of dot distance may be a value greater than a certain value.

Figure 9:
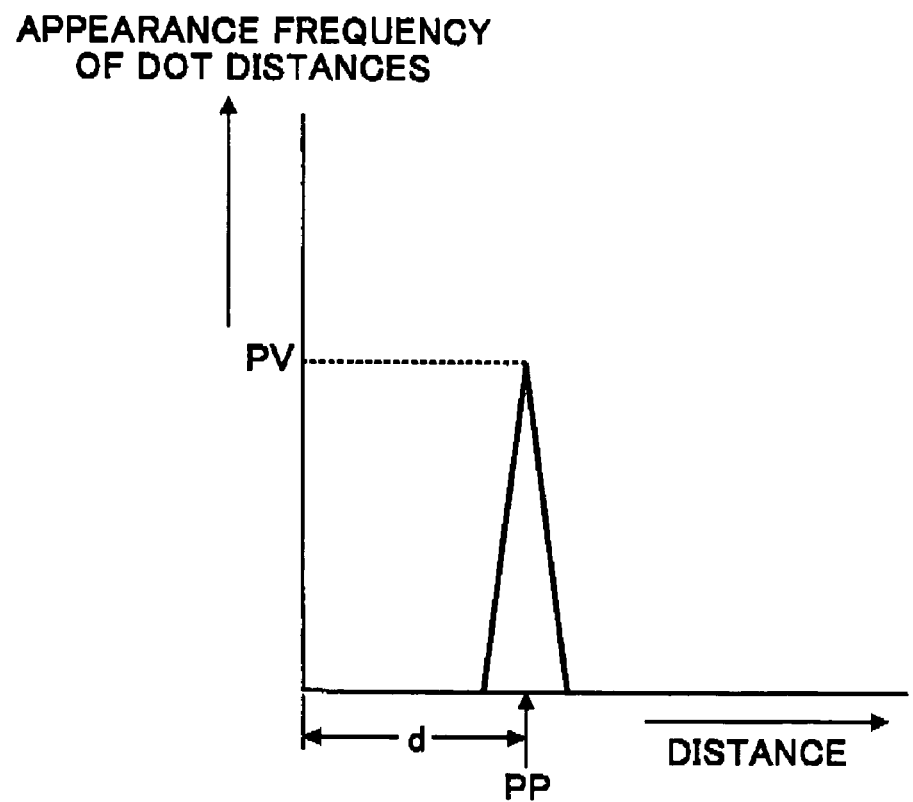
FIG. 9 is a graph representing a relationship between the dot distance and an appearance frequency of the dot distances.

At the detection of the peak position PP calculated by the CPU 204a, the detection tolerance varies depending on a predetermined threshold value for determining the peak value, or, in the graph of FIG. 9, a predetermined value in the vertical axis. If the predetermined threshold value for determining the peak value is set to a relatively low value, the occurrence frequency of erroneous dot detection or omission is decreased while increasing the occurrence frequency of an excessive degree of detection. On the other hand, if the predetermined threshold value for determining the peak value is set to a relatively high value, the occurrence frequency of an excessive degree of detection is decreased but the occurrence frequency of erroneous dot detection or omission is increased. Therefore, the relationship between the occurrence frequency of erroneous dot detection or omission and the occurrence frequency of an excessive degree of detection can be set to an appropriately value by the determination of the predetermined threshold value for determining a peak value.

As described above, the CPU 204a calculates the dot number of the detected dots 106 and stores the accumulated dot number Z2 in the registration memory area of the RAM 204c, in Step S106. Also, the CPU 204a calculates a dot-distance appearance frequency Z3 with respect to the dot distances d based on the peak position and the peak value of the dot distances d and stores a resultant dot-distance appearance frequency Z3 into the registration memory area of the RAM 204c, in Step S108. Thereafter, in subsequent Step S109 according to the present invention, the CPU 204a performs two determinations: whether the accumulated dot number Z2 of the detected dots 106 stored in the registration memory area of the RAM 204c in Step S106 is within a range X2 determined by the corresponding second-type reference dot number and the second-type dot number threshold value prestored in the memory 231 of the RAM 204c, and whether the dot-distance appearance frequency Z3 calculated, in Step S108, based on the peak position and the peak value of the dot distances d stored, in Step S107, in the registration memory area of the RAM 204c is within a range X3 the corresponding second-type reference dot distance and the second-type dot distance threshold value prestored in the memory 231 of the RAM 204c.

When the above-mentioned two determinations both bring negative results in Step S109, the CPU 204a turns the determination result of Step S109 to NO and consequently the CPU 204a ends the process. When at least one of the two determinations brings a positive result in Step S109, the CPU 204a turns the determination result of Step S109 to YES and consequently the CPU 204a determines that the characteristic quantity of the detected background dot pattern 103 included in the original image 101 is identical to the characteristic quantity of the dot pattern of the copy-protected document. As a result, it becomes apparent that the original image 101 read by the scanner 201, for example, includes at least one of the base area 104 of the background dot pattern 103, the message area 105 of the background dot pattern 103, and the dot pattern 103 made solely of the single-sized dots 106c.

When the determination result of Step S109 is YES, as described above, the CPU 204a proceeds to Step S110 in which the CPU 204a performs the copy prohibition determination according to a predetermined standard. This predetermined standard may include a parameter and is previously stored in the memory 231 of the RAM 204c. As an alternative, this predetermined standard may be entered through the operation display panel 205 into the memory 231 of the RAM 204c.

In the way as described above, as one example, the CPU 204a determines that the original image 101 read by the scanner 201 is identical to the copy-protected document such as the contract sheet 100 of FIG. 1 when the background dot pattern 103 of the original image 101 is determined as including one of the base area 104 and the message area 105, through the copy prohibition determination performed in Step S110. As another example, the CPU 204a determines that the original image 101 read by the scanner 201 is identical to the copy-protected document such as the contract sheet 100 of FIG. 1 when the background dot pattern 103 of the original image 101 is determined as including both the base area 104 and the message area 105. As further another example, the CPU 204a determines that the original image 111 read by the scanner 201 is identical to the copy-protected document such as the contract sheet 100 of FIG. 1 when the original image 111 is determined as including the background dot pattern 113.

Thus, the CPU 204a performs the step and process of detecting the characteristic quantitative information of the background dot pattern 103 predefined as a copy-protected document from the image data of the original image 101 read by the scanner 201. The CPU 204a also performs the step and process of comparing the detected characteristic quantitative information with the corresponding second-type reference characteristic quantitative information prestored as the characteristic quantitative information of a copy-protected document in the memory 231. The CPU 204a further performs the step and process of determining whether the detected characteristic quantitative information is identical to the corresponding second-type reference characteristic quantitative information prestored in the memory 231. Thus, regardless of the types of the original image, by confirming whether the detected characteristic quantitative information is identical to the corresponding second-type reference characteristic quantitative information, the CPU 204a determines whether it is permissible to output the image data of the original image 101.

In Step S111, the CPU 204a refers to the determination result of Step S110 and determines a subsequent process. That is, the CPU 204a ends the process when the original image 101 is determined as not the copy-protected document in Step S110 and the determination result of Step S110 is NO, but it proceeds to Step S112 when the original image 101 is determined as the copy-protected document in Step S110 and the determination result of Step S110 is YES. Then, in Step S112, the CPU 204a sends to the client PC 2001 serving as an administrator a notification of the determination result, and ends the process.

In the process of Step S112, as a first example, the CPU 204a sends e-mail to the client PC 2001 with information including the determination result and an identification code. As a second example, the CPU 204a encrypts the image data including the detected background dot pattern 103 and stored in the hard disk drive 213, for example, and sends e-mail to the client PC 2001 with the determination result and the encrypted image data.

In the above-mentioned second example, there is one condition that a software for decoding the encrypted image data is preinstalled in the client PC 2001 so that an administrator can view the encrypted image data on the client PC 2001 and easily recognize the original image 101 obtained through an inequitable reading operation.

The first example makes an administrator aware of an identification code for the original image 101 obtained through an inequitable reading operation, through the e-mail. Therefore, if an administrator knows image data assigned by the identification code, he or she could trace back the inequitable image reading operation. In the image processing apparatus 1, the system controller 204 is provided with a function for outputting image data assigned by identification codes.

Figure 16:
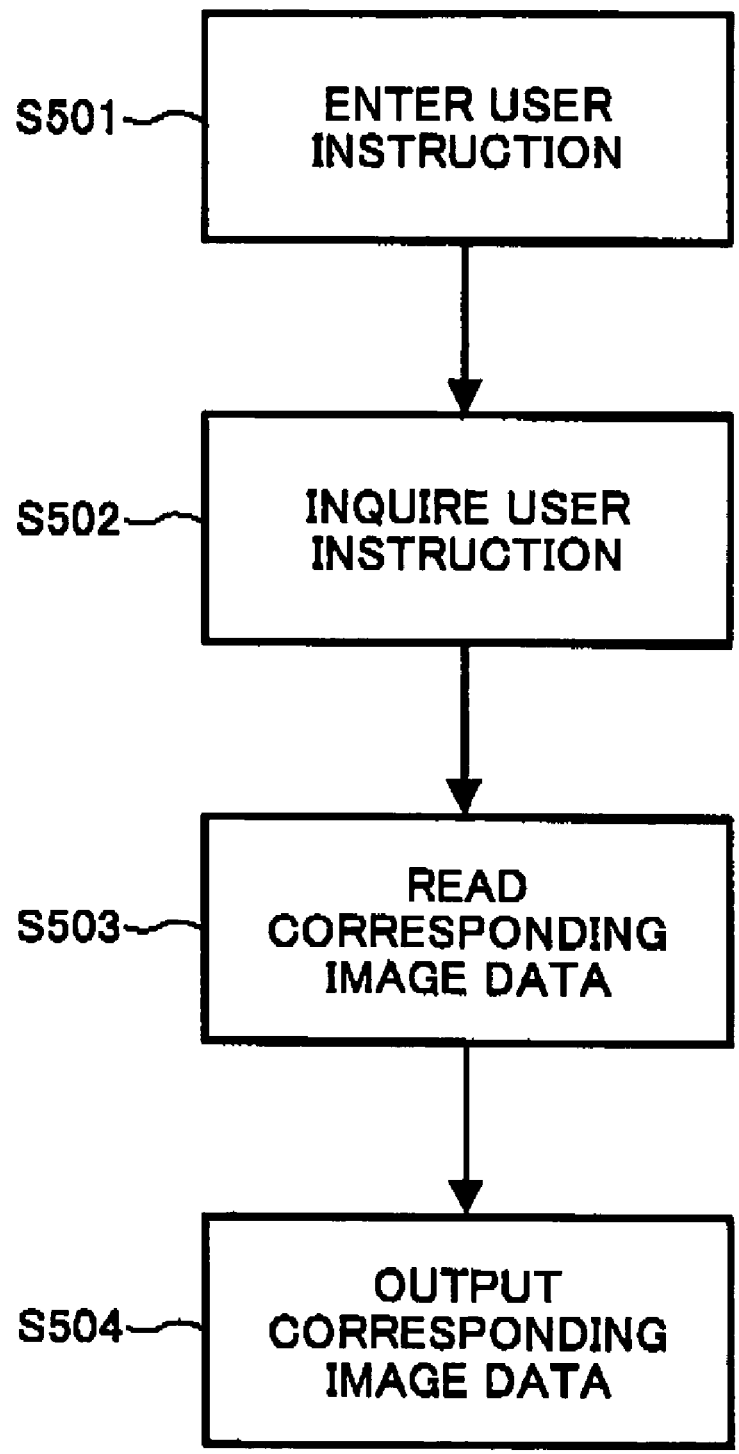
FIG. 16 is a flowchart of an exemplary procedure of a copy-prohibited document reproducing operation performed by the image processing apparatus of FIG. 14.

Referring to FIG. 16, two exemplary procedures of copy-protected document output operation performed by the image processing apparatus 1. In a first exemplary procedure, an administrator enters an instruction through the client PC 2001 to the system controller 204 of the image processing apparatus 1 to output an original image determined as the inequitably-read copy-protected document by the image processing apparatus 1. In response to the instruction, the system controller 204 sends to the client PC 2001 a request for sending an administrator identification code for identifying an administrator and an image identification code for identifying an image read through an inequitable image reading operation.

Then, upon a time the administrator sends the administrator identification code and the image identification code to the system controller 204 of the image processing apparatus 1, the system controller 204 of the image processing apparatus 1 recognizes such input of the user instruction, in Step S501 of FIG. 16. Then, in Step S502, the system controller 204 verifies the administrator identification code and the image identification code. When the administrator identification code and the image identification code are determined as proper, the system controller 204 reads the image data assigned by the image identification code from the hard disk drive 213, for example, in Step S503. Then, the system controller 204 outputs the image data read from the hard disk drive 213 on a recording sheet, in Step S504. Thereby, the image data specified with the image identification code by the administrator is output.

In this way, the administrator can be aware of the contents of the image data associated with the image identification code by sending such code through e-mail from the client PC 2001. Thus, the administrator can easily trace back the inequitable image reading conduct.

In a second exemplary procedure of copy-protected document output operation performed by the image processing apparatus 1, an administrator is made aware of the original image 101 which is determined as being read in an inequitable image reading operation, through a received e-mail sent from the system controller 204 of the image processing apparatus 1. Then, if the administrator needs to view the contents of the inequitably read image data, he or she needs to come to the image processing apparatus 1 and enters an instruction through the operation display panel 205 to the system controller 204 of the image processing apparatus 1 to output an original image determined as the inequitably-read copy-protected document by the image processing apparatus 1. In response to the instruction, the system controller 204 of the image processing apparatus 1 requests for entering an administrator identification code for identifying an administrator and an image identification code for identifying the inequitably read original image 101.

Then, upon a time the administrator enters the administrator identification code and the image identification code through the operation display panel 205 to the system controller 204 of the image processing apparatus 1, the system controller 204 of the image processing apparatus 1 recognizes such input of the user instruction, in Step S501 of FIG. 16. Then, in Step S502, the system controller 204 verifies the administrator identification code and the image identification code. When the administrator identification code and the image identification code are determined as proper, the system controller 204 reads the image data assigned by the image identification code from the hard disk drive 213, for example, in Step S503. Then, the system controller 204 outputs the image data read from the hard disk drive 213 on a recording sheet, in Step S504. Thereby, the image data specified with the image identification code by the administrator is output.

In this way, the administrator can be aware of the contents of the image data associated with the image identification code by sending such code through e-mail from the client PC 2001. Thus, the administrator can easily trace back the inequitable image reading conduct.

As described above, the image processing apparatus 1 is provided with the first and second copy protection systems performing the first and second copy protection operations, respectively, which are different from each other, for determining whether the detected characteristic quantitative information is identical to the first-type reference value or the second-type reference value. The first copy protection system uses the digital circuits, the image processor 202 to determine whether the dot density as the detected characteristic quantitative information is identical to the corresponding first-type reference value prestored in the memory 253a, 254a, or 255a. The second copy protection system uses the program installed in the computer 1001 to determine according to the program whether the dot density and the dot distance as the detected characteristic quantitative information are identical to the corresponding second-type reference values prestored in the memory 231. With this configuration, the first copy protection system allows a less number of occurrences of excessively rigorous determinations and a relatively great number of occurrences of erroneous dot detection or omission. But, in contrast to it, the second copy protection system allows a relatively great number of occurrences of excessively rigorous determinations and a less number of occurrences of erroneous dot detection or omission.

The relationships of the numbers of occurrences of excessively rigorous determinations and erroneous dot detection or omission between the first and second copy protection systems can suitably adjusted by appropriately changing the balance between the first-type dot density threshold values stored in the memories 253a, 254a, and 255a and the second-type dot density threshold value stored in the memory 231. More specifically, by setting first-type dot density threshold values stored in the memories 253a, 254a, and 255a to a moderate value and the second-type dot density threshold value stored in the memory 231 to a value more rigorous than the first-type dot density threshold value, the first copy protection system achieves a less number of occurrences of excessively rigorous determinations and a relatively great number of occurrences of erroneous dot detection or omission while the second copy protection system achieves a relatively great number of occurrences of excessively rigorous determinations and a less number of occurrences of erroneous dot detection or omission. By setting first-type dot density threshold values stored in the memories 253a, 254a, and 255a to a value close to the second-type dot density threshold value stored in the memory 231, the first copy protection system achieves a greater number of occurrences of excessively rigorous determinations and a less number of occurrences of erroneous dot detection or omission while the second copy protection system achieves a less number of occurrences of excessively rigorous determinations and a greater number of occurrences of erroneous dot detection or omission.

Further, the relationships of the numbers of occurrences of excessively rigorous determinations and erroneous dot detection or omission between the first and second copy protection systems can suitably adjusted by appropriately changing the second-type threshold value for the dot distance appearance frequency, that is, the peak position and the peak value for the distance between adjacent two dots, stored in the memory 231. For example, the higher the second-type threshold value for the peak value is, the more excessively rigorous the determinations are. In this case, the copy protection system may severely reject a dot distance which has a value normally be treated as data taken into account. On the other hand, this setting decreases the number of erroneous dot detection or omission. Also, as another example, the higher the second-type threshold value for the peak position is, the more excessively rigorous the determinations are. In this case, the copy protection system may severely reject a dot distance which has a value normally be treated as data taken into account. On the other hand, this setting decreases the number of erroneous dot detection or omission. Therefore, when the second-type threshold values for the peak position and the peak value are set higher, the second copy protection system performs the copy protection operation in a manner with the less number of occurrences of excessively rigorous determinations and the greater number of erroneous dot detection or omission more in comparison with those of the first copy protection system.

In addition, since the first and second copy protection systems use the digital circuits and the program, respectively, as described above, the first copy protection system features a high speed performance of the first copy protection operation and the second copy protection system features a high precision performance of the second copy protection operation.

The image processing apparatus 1 activates the above-described first and second copy protection systems at the same time so that they efficiently operate in parallel to each other without wasting time.

When the first copy protection system configured with digital-circuits determines that the detected image data of the original image 101 includes the dot pattern of the registered copy-protected document, it enters and performs the reproduction prohibition process, as described above. In this case, the first copy protection system executes the determination whether to permit or prohibit the reproduction of the image by the printer 203 at high speed without wasting the time of the user.

In contrast to it, the second copy protection system, the software-driven system, performs the reproduction prohibition process not in such a high speed as the first copy protection system but in a more flexible manner, or at precision higher than the first copy protection system. In order not to waste the time of the user, when the first copy protection system determines that the detected image data of the original image 101 does not include the dot pattern of the registered copy-protected document, the first copy protection system has a higher priority to permit the reproduction over determination by the second copy protection system. That is, the first copy protection system permits the reproduction of the original image 101 without waiting the determination result of the second copy protection system. In this instance, it is possible that the determination by the first copy protection system is erroneous due to an occurrence of erroneous dot detection or omission. Therefore, when the second copy protection system determines that the detected image data of the original image 101 includes the dot pattern of the registered copy-protected document, the image processing apparatus 1 sends a notification of such determination by the second copy protection system to the client PC 2001 so as to enable the administrator to trace back the inequitable copy operation.

Figure 17:
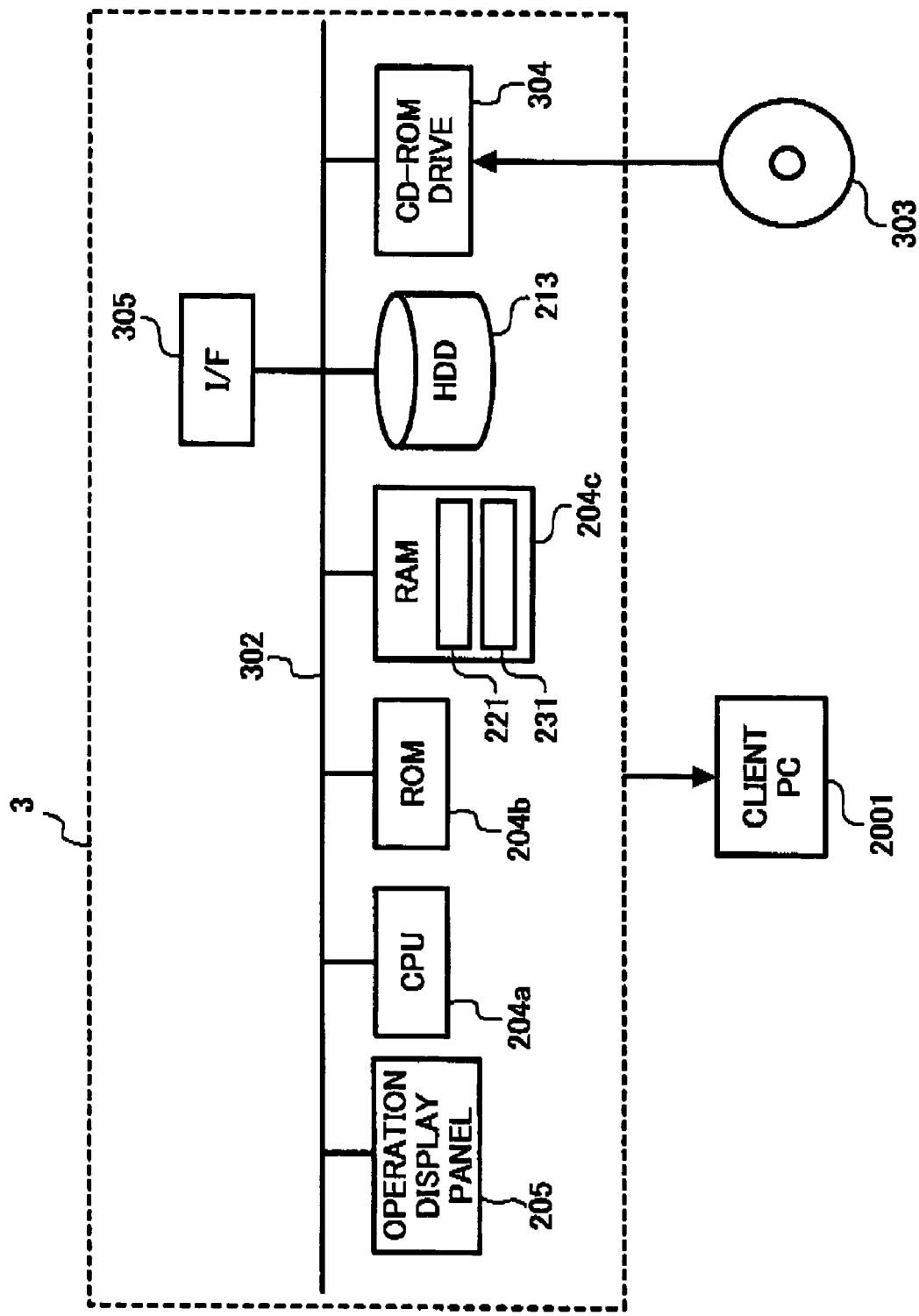
FIG. 17 is a schematic block diagram of an image processing apparatus of FIG. 14 for explaining the first and second copy protection systems both running on programs.

Next, an image processing apparatus 3 according to another exemplary embodiment of the present invention is explained with reference to FIGS. 17-19. FIG. 17 illustrates an exemplary structure of the image processing apparatus 3 which is configured to perform both first and second copy protection operations using computer programs installed in the hardware resources of the image processing apparatus 3 to detect the copy-protected document such as the contract sheet 100 of FIG. 1 and to arrange the copy prohibition operation based on this detection result.

As shown in FIG. 17, the image processing apparatus 3 includes the CPU 204a, the ROM 204b, the RAM 204c, the hard disc drive (HDD) 213, an internal bus 302, a CD-ROM (compact disc read only memory) drive 304, and an interface (I/F) 305. The CPU 204a, the ROM 204b, and the RAM 204c are connected to each other via the internal bus 302 and form a microcomputer. The ROM 204b stores various programs including a BIOS (basic input output system). The RAM 204c is a rewritable memory and includes a working memory area for the CPU 204a to tentatively store various transaction data and a memory 221 and the memory 231. The hard disc drive 213 stores various computer programs including an image processing program. The CD-ROM drive 304 reads data written in a CD-ROM 303 when the CD-ROM 303 is inserted into the CD-ROM drive 304. The interface 305 interfaces these components.

In one example, the image processing program installed in the hard disc drive 213 is a program initially written in the CD-ROM 303 and which is loaded by the CPU 204a to the hard disc drive 213. When the CPU 204a starts the image processing program stored in the hard disc drive 213 is started, it first copies the image processing program in the RAM 204c and then performs the program. In this case, each of the RAM 204c, the hard disc drive 213, and the CD-ROM 303 is regarded as a data storing medium to store the computer programs including the image processing program.

As an alternative to the CD-ROM 303 to store the computer programs, various kinds of medium can be used, such as optical discs including a DVD (digital versatile disc), magneto-optical discs, magnetic discs including a flexible disc, semiconductor memory, etc. It is also possible to install the computer programs in the hard disc drive 213 by downloading them from a data server serving as an external program resource through the Internet. In this case, a data storing device of the data server for storing the computer programs including the image processing program is regarded as a data storing medium to store the computer programs including the image processing program.

The above-mentioned image processing program may be a program running on a predetermined operating system, or a program included in a program file of series programs forming a predetermined application software such as a word-processing application or in a predetermined operating system. In the case that the image processing program runs on a predetermined operating system, a part of the various jobs of the copy protection operation may be handled by the predetermined operating system.

Figure 18:
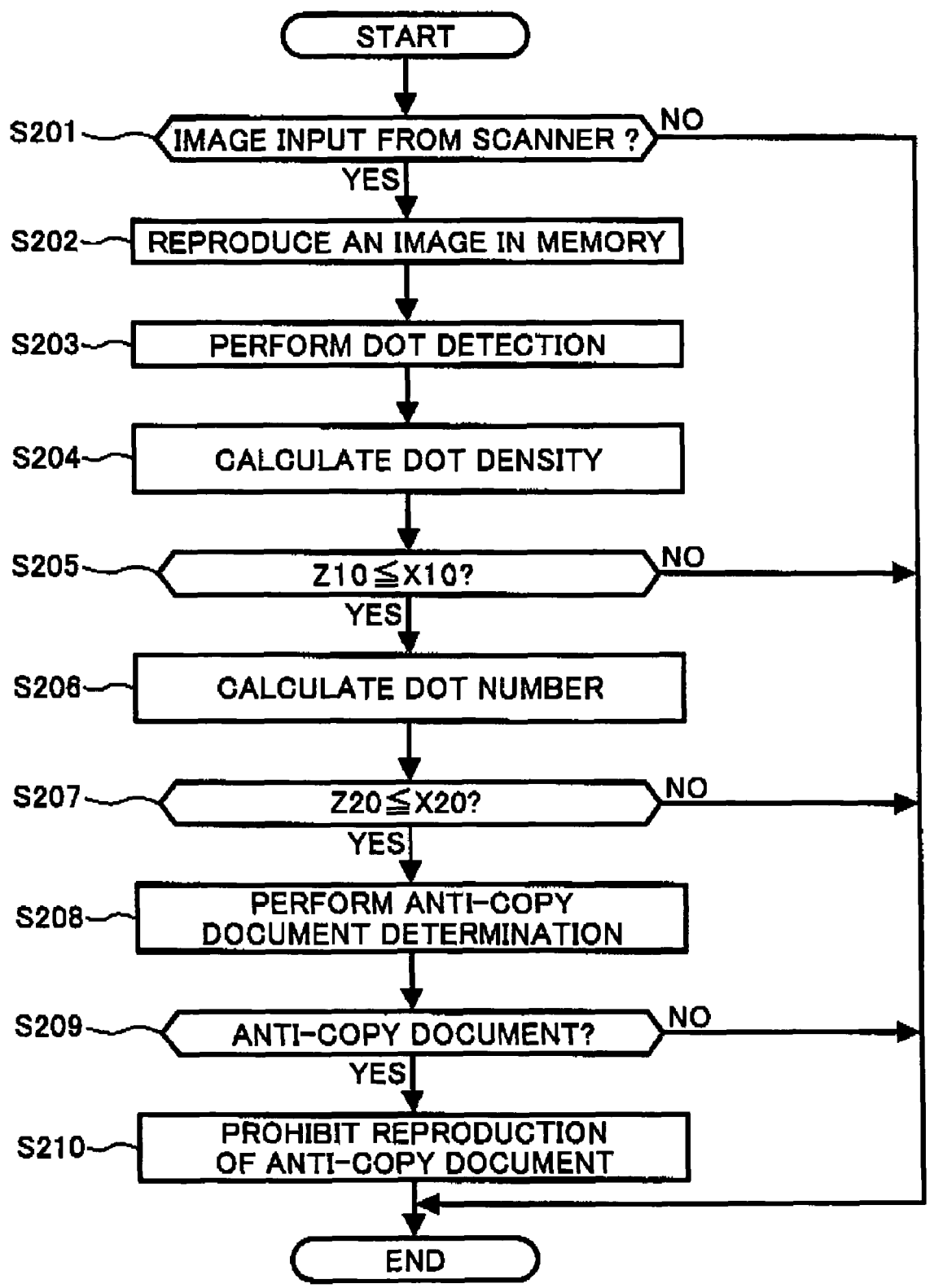

Referring to FIG. 18, an exemplary procedure of the copy protection operation performed by the image processing apparatus 3 is explained. With respect to the first copy protection system of the image processing apparatus 3 of FIG. 17, a computer program for the first copy protection operation is installed in the hard disk drive 213 to perform its first group of job steps for detecting and determining a copy-protected document such as the contract sheet 100 of FIG. 1 and, upon a detection of such a copy-protected document, instructing the CPU 204a to perform the reproduction prohibition operation so as to prohibit duplication of such sheet.

In Step S201 of FIG. 18, the CPU 204a repeatedly checks whether image data of the original image 101 externally transmitted through the interface 305 is input to the image processing apparatus 3. This check operation is repeatedly performed at predetermined time intervals until the CPU 204a determines an event that image data is input. Upon a time the CPU 204a determines an event that image data is input and the check result of Step S201 becomes YES, the CPU 204a stores the input image data into an image memory area in the RAM 204c, in Step S202. As an alternative, the input image data may be stored in the hard disk drive 213, in Step S202. Then, in Step S203, the CPU 204a detects the dots 106 from the input image data stored in the image memory of the RAM 204c. An actual detection method may be one of various conventional methods for detecting images such as a pattern matching method. Then, in Step S204, the CPU 204a calculates a dot density in a specific unit area of the detected dots 106.

In this embodiment, the memory 221 included in the RAM 204c as a nonvolatile memory or a battery-backed-up memory to store data including a plurality of data sets for determining a dot density. One of the plurality of data sets for determining a dot density includes a first-type reference dot-density value set and a first-type dot-density threshold value set, based on which an identity determination is performed on the detected background dot pattern 103 including the base area 104 and the message area 105 in the original image 101.

More specifically, in order to handle the copy-protected document shown in FIG. 2, for example, in which the background dot pattern 103 includes the base area 104 and the message area pattern 105, various data sets are stored in the memory 221, including a dot-density data set and a dot-number data set which are used to calculate a dot density in a specific area of the detected dots 106. The dot-density data set includes a first-type reference base-area dot-density value and a first-type base-area dot-density threshold value, based on which an identity determination is performed on a dot density in a specific unit area of the base area 104 in the detected background dot pattern 103 included in the original sheet 102. The dot-number data set includes a first-type reference base-area dot-number value and a first-type base-area dot-number threshold value, based on which an identity determination is performed on a dot number in a specific unit area of the base area 104 in the detected background dot pattern 103 included in the original sheet 102. The dot-density data set further includes a first-type reference message-area dot-density value and a first-type message-area dot-density threshold value, based on which an identity determination is performed on a dot density in a specific unit area of the message area 105 in the detected background dot pattern 103 included in the original sheet 102. The dot-number data set further includes a first-type reference message-area dot-number value and a first-type message-area dot-number threshold value, based on which an identity determination is performed on a dot number in a specific unit area of the message area 105 in the detected background dot pattern 103 included in the original sheet 102.

Further, in order to handle the copy-protected document shown in FIGS. 6A-7B, for example, in which the background dot pattern 113 is made up solely with a single-sized dot (i.e., the dots 106c), various data sets are also stored in the memory 221, including a dot-density data set and a dot-number data set. In this case, the dot-density data set includes a first-type reference dot-density value and a first-type dot-density threshold value, based on which an identity determination is performed on a dot density in a specific unit area in the detected background dot pattern 113. The dot-number data set further includes a first-type reference dot-number value and a first-type dot-number threshold value, based on which an identity determination is performed on a dot number in a specific unit area in the detected background dot pattern 113 included in the original sheet 112.

In Step S205, the CPU 204a determines whether a dot density Z10 in a specific unit area of the dots 106 detected in Step S204 is within a range X10 determined by the corresponding first-type reference dot density and the first-type dot density threshold value, stored in the memory 221 of the RAM 204c, with respect to the dot density of the corresponding background dot pattern of the copy-protected document. This threshold value represents one of the first-type base-area dot-density threshold value of the base area 104 in the background dot pattern 103, the first-type message-area dot-density threshold value of the message area 105 in the background dot pattern 103, and the first-type dot-density threshold value in the background dot pattern 113.

When the CPU 204a determines that the dot density Z10 in a specific unit area of the dots 106 detected in Step S204 is within the range X10 determined by the corresponding first-type reference dot density and the first-type dot density threshold value and the determination result of Step S205 becomes YES, the CPU 204a performs a dot number calculation to accumulate the dot number of the detected dots 106, in Step S206. As a result of the accumulation, an accumulated dot number Z20 is generated and is accumulated in a registration memory area of the RAM 204c, for example. On the other hand, the CPU 204a ends the process upon determining that the dot density Z10 in a specific unit area of the dots 106 detected in Step S204 is not within the range X10 determined by the corresponding first-type reference dot density and the first-type dot density threshold value and the determination result of Step S205 becomes NO.

As described above, the CPU 204a calculates the dot number of the detected dots 106 and stores the accumulated dot number Z20 in the registration memory area of the RAM 204c, in Step S206. Thereafter, in subsequent Step S207 according to the present invention, the CPU 204a performs a determination whether the accumulated dot number Z20 of the detected dots 106 stored in the registration memory area of the RAM 204c in Step S206 is within a range X20 determined by the corresponding first-type reference dot number and the first-type dot number threshold value prestored in the memory 231 of the RAM 204c.

When the above-mentioned determination brings a negative result in Step S207, the CPU 204a turns the determination result of Step S207 to NO and consequently the CPU 204a ends the process. On the other hand, when the determination brings a positive result in Step S207, the CPU 204a turns the determination result of Step S207 to YES and consequently the CPU 204a determines that the characteristic quantity of the detected background dot pattern 103 included in the original image 101 is identical to the characteristic quantity of the dot pattern of the copy-protected document. As a result, it becomes apparent that the input original image 101, for example, includes at least one of the base area 104 of the background dot pattern 103, the message area 105 of the background dot pattern 103, and the dot pattern 103 made solely of the single-sized dots 106c.

When the determination result of Step S207 is YES, as described above, the CPU 204a proceeds to Step S208 in which the CPU 204a performs the copy prohibition determination according to a predetermined standard. This predetermined standard may include a parameter and is previously stored in the memory 221 of the RAM 204c. As an alternative, this predetermined standard may be entered through the operation display panel 205 into the memory 221 of the RAM 204c.

In the way as described above, as one example, the CPU 204a determines that the input original image 101 is identical to the copy-protected document such as the contract sheet 100 of FIG. 1 when the background dot pattern 103 of the original image 101 is determined as including one of the base area 104 and the message area 105, through the copy prohibition determination performed in Step S208. As another example, the CPU 204a determines that the input original image 101 is identical to the copy-protected document such as the contract sheet 100 of FIG. 1 when the background dot pattern 103 of the original image 101 is determined as including both the base area 104 and the message area 105. As further another example, the CPU 204a determines that the input original image 111 is identical to the copy-protected document such as the contract sheet 100 of FIG. 1 when the original image 111 is determined as including the background dot pattern 113.

Thus, the CPU 204a performs the step and process of detecting the characteristic quantitative information of the background dot pattern 103 predefined as a copy-protected document from the image data of the input original image 101. The CPU 204a also performs the step and process of comparing the detected characteristic quantitative information with the corresponding first-type reference characteristic quantitative information prestored as the characteristic quantitative information of a copy-protected document in the memory 221. The CPU 204a further performs the step and process of determining whether the detected characteristic quantitative information is identical to the corresponding first-type reference characteristic quantitative information prestored in the memory 221. Thus, regardless of the types of the original image, by confirming whether the detected characteristic quantitative information is identical to the corresponding first-type reference characteristic quantitative information, the CPU 204a determines whether it is permissible to output the image data of the original image 101.

In Step S209, the CPU 204a refers to the determination result of Step S208 and determines a subsequent process. That is, the CPU 204a ends the process when the original image 101 is determined as not the copy-protected document in Step S209 and the determination result of Step S209 is NO, but it proceeds to Step S210 when the original image 101 is determined as the copy-protected document in Step S209 and the determination result of Step S209 is YES. Then, in Step S210, the CPU 204a performs the copy prohibition process, and ends the process. In one example of the copy prohibition process, the CPU 204a provides the image data stored in the image memory or the hard disk drive 213, for example, and determined as a copy-protected document with a mark indicating that it is determined as a copy-prohibited document. When a user instruction is made to output image data stored in the image memory or the hard disk drive 213, the CPU 204a checks whether the image data has a mark indicating that it is determined as a copy-protected document. The CPU 204a outputs the image data when the image data does not have such mark. But, the CPU 204a prohibits an output of the image data when the image data has the mark.

Referring to FIG. 19, an explanation is made for an exemplary procedure of the second copy protection operation performed in accordance with the computer program stored in the hardware resources of the image processing apparatus 3 of FIG. 17. In Step S301 of FIG. 19, the CPU 204a of the system controller 204 repeatedly checks whether image data of the original image 101 is input. This check operation is repeatedly performed at predetermined time intervals until the CPU 204a determines an event that image data is input. Upon a time the CPU 204a determines an event that image data is input and the check result of Step S101 is YES, the CPU 204a stores the input image data into an image memory area included in the RAM 204c, in Step S302. As an alternative, the CPU 204a may store the input image data in the hard disk drive 213. In Step S303, the CPU 204a detects the dots 106 from the input image data stored in the image memory of the RAM 204c. An actual detection method may be one of various conventional methods for detecting images such as a pattern matching method. Then, in Step S304, the CPU 204a calculates a dot density in a specific unit area of the detected dots 106.

In this embodiment, the RAM 204c includes a memory 231 which is one of a nonvolatile memory and a battery-backed-up memory to store data including a plurality of data sets for determining a dot density and a distance between dots. One of the plurality of data sets for determining a dot density includes a second-type reference dot-density value set and a second-type dot-density threshold value set based on which an identity determination is performed on a dot density in a specific unit area in the detected background dot pattern 103 included in the original sheet 102. Another one of the plurality of data sets for determining a dot number includes a second-type reference dot-number value set and a second-type dot-number threshold value set based on which an identity determination is performed on a dot number in a specific unit area in the detected background dot pattern 103 included in the original sheet 102. Another one of the plurality of data sets for determining a dot distance includes a second-type reference dot-distance value set and a second-type dot-distance threshold value set for a peak position and a peak value with respect to an appearance frequency of dot distances, based on which an identity determination is performed with respect to the dot distances.

More specifically, in order to handle the copy-protected document shown in FIG. 2, for example, in which the background dot pattern 103 includes the base area 104 and the message area pattern 105, various data sets are stored in the memory 231, including a dot-density data set, a dot-number data set, and a dot-distance data set. The dot-density data set and the dot-number data set are used to calculate a dot density in a specific area of the detected dots 106. The dot-distance data set is used to calculate a distance between dots. The dot-density data set includes a second-type reference base-area dot-density value and a second-type base-area dot-density threshold value, based on which an identity determination is performed on a dot density in a specific unit area of the base area 104 in the detected background dot pattern 103. The dot-number data set includes a second-type reference base-area dot-number value and a second-type base-area dot-number threshold value, based on which an identity determination is performed on a dot number in a specific unit area of the base area 104 in the detected background dot pattern 103 included in the original sheet 102. The dot-distance data set includes a second-type reference base-area dot-distance value and a second-type dot-distance threshold value for a peak position and a peak value with respect to an appearance frequency of distances of dots in the base area 104, based on which an identity determination is performed with respect to the dot distances. The dot-density data set further includes a second-type reference message-area dot-density value and a second-type message-area dot-density threshold value, based on which an identity determination is performed on a dot density in a specific unit area of the base area 104 in the detected background dot pattern 103. The dot-number data set further includes a second-type reference message-area dot-number value and a second-type message-area dot-number threshold value, based on which an identity determination is performed on a dot number in a specific unit area of the base area 104 in the detected background dot pattern 103 included in the original sheet 102. The dot-distance data set further includes a second-type reference message-area dot-distance value and a second-type dot-distance threshold value for a peak position and a peak value with respect to an appearance frequency of distances of dots in the base area 104, based on which an identity determination is performed with respect to the dot distances.

Further, in order to handle the copy-protected document shown in FIGS. 6A-7B, for example, in which the background dot pattern 113 is made up solely with a single-sized dot (i.e., the dots 106*c*), various data sets are stored in the memory 231, including a dot-density data set, a dot-number data set, and a dot-distance data set. In this case, the dot-density data set includes a second-type reference dot-density value and a second-type dot-density threshold value, based on which an identity determination is performed on a dot density in a specific unit area in the detected background dot pattern 103. The dot-number data set includes a second-type reference dot-number value and a second-type dot-number threshold value, based on which an identity determination is performed on a dot number in a specific unit area in the detected background dot pattern 103 included in the original sheet 102. The dot-distance data set includes a second-type reference dot-distance value and a second-type dot-distance threshold value for a peak position and a peak value with respect to an appearance frequency of distances of dots, based on which an identity determination is performed with respect to the dot distances.

In Step S305, the CPU 204*a* determines whether a dot density Z11 in a specific unit area of the dots 106 detected in Step S304 is within a range X11 determined by the corresponding second-type reference dot density and the second-type dot density threshold value, stored in the memory 231 of the RAM 204*c*, with respect to the dot density of the corresponding background dot pattern of the copy-protected document. This threshold value represents one of the second-type base-area dot-density threshold value of the base area 104 in the background dot pattern 103, the second-type message-area dot-density threshold value of the message area 105 in the background dot pattern 103, and the second-type dot-density threshold value in the background dot pattern 113.

When the CPU 204*a* determines that the dot density Z11 in a specific unit area of the dots 106 detected in Step S304 is within the range X11 determined by the corresponding second-type reference dot density and the second-type dot density threshold value and the determination result of Step S305 becomes YES, the CPU 204*a* performs a dot number calculation to accumulate the dot number of the detected dots 106, in Step S306. As a result of the accumulation, an accumulated dot number Z12 is generated and is accumulated in a registration memory area of the RAM 204*c*, for example. When the CPU 204*a* determines that the dot density Z11 in a specific unit area of the dots 106 detected in Step S304 is not within the range X11 determined by the corresponding second-type reference dot density and the second-type dot density threshold value and the determination result of Step S305 becomes NO, the process proceeds to Step S307. This negative result from the identity determination in Step S305 represents a case in which the CPU 204*a* determines the dot density detected as the characteristic quantity of the original image 101 as not identical to the characteristic quantity of the background dot pattern in the copy-protected document. On the other hand, the accumulated dot number Z12 calculated and accumulated in the registration area of the RAM 204*a* in Step S306 is used in Step S309 for the identity determination as to whether the dot density detected as the characteristic quantity of the original image 101 is identical to the characteristic quantity of the background dot pattern in the copy-protected document. Accordingly, the process of Step S306 is not needed and is therefore skipped when the CPU 204*a* determines that the dot density Z11 in a specific unit area of the dots 106 detected in Step S304 is not in the range X11 determined by the corresponding second-type reference dot density and the second-type dot density threshold value and the determination result of Step S305 becomes NO, that is, when the dot density detected as the characteristic quantity of the original image 101 is determined as not identical to the characteristic quantity of the background dot pattern in the copy-protected document.

Processes of Steps S307 and S308 and subsequent processes through to Steps S311 are those to determine, with respect to the characteristic quantity as dot distance, whether the dot density detected as the characteristic quantity of the original image 101 is identical to the characteristic quantity of the background dot pattern in the copy-protected document.

That is, this embodiment of the present invention uses two characteristic quantities of dot density and dot distance to determine whether the dot density detected as the characteristic quantity of the original image 101 is identical to the characteristic quantity of the background dot pattern in the copy-protected document.

In Step S307, the CPU 204*a* performs the calculation of the dot distance d between two adjacent dots 106 included in the detected background dot pattern 103. For example, the CPU 204*a* seeks coordinates of the centers of the two adjacent dots 106 and a distance between the positions represented by the coordinates sought, thereby obtaining the dot distance d. In Step S307, the CPU 204*a* calculates a plurality of sets of two adjacent dots 106 to obtain a plurality of dot distances d and stores them into the registration memory area of the RAM 204*c*, for example.

In Step S308, the CPU 204*a* performs the calculation of an appearance frequency of the dot distance d. For example, the CPU 204*a* calculates a peak value (i.e., the peak value PV) and a peak position (i.e., the peak position PP) based on the dot distances d calculated in Step S307 and regards a resultant figure as the appearance frequency of the dot distances d. As apparent from the graph of FIG. 9, the peak position PP obtained based on the plurality of dot distances d is assumed to represent an actual dot distance d with respect to the plurality of dots 106 detected in Step S303. The peak value PV indicates a degree of concentration of the dots 106 detected in Step S303 at the peak position PP. In the case of the background dot pattern 113 of FIG. 10A or 10B, the appearance frequency of dot distance with respect to the plurality of dots 106*c* which are detected in Step S303 can be expressed by the graph of FIG. 9. In this case, the peak value PV of the appearance frequency of dot distance may be a value greater than a certain value.

At the detection of the peak position PP calculated by the CPU 204a, the detection tolerance varies depending on a predetermined threshold value for determining the peak value, or, in the graph of FIG. 9, a predetermined value in the vertical axis. If the predetermined threshold value for determining the peak value is set to a relatively low value, the occurrence frequency of erroneous dot detection or omission is decreased while increasing the occurrence frequency of an excessive degree of detection. On the other hand, if the predetermined threshold value for determining the peak value is set to a relatively high value, the occurrence frequency of an excessive degree of detection is decreased but the occurrence frequency of erroneous dot detection or omission is increased. Therefore, the relationship between the occurrence frequency of erroneous dot detection or omission and the occurrence frequency of an excessive degree of detection can be set to an appropriately value by the determination of the predetermined threshold value for determining a peak value.

As described above, the CPU 204a calculates the dot number of the detected dots 106 and stores the accumulated dot number Z12 in the registration memory area of the RAM 204c, in Step S306. Also, the CPU 204a calculates a dot-distance appearance frequency Z13 with respect to the dot distances d based on the peak position and the peak value of the dot distances d and stores a resultant dot-distance appearance frequency Z13 into the registration memory area of the RAM 204c, in Step S308. Thereafter, in subsequent Step S309 according to the present invention, the CPU 204a performs two determinations: whether the accumulated dot number Z12 of the detected dots 106 stored in the registration memory area of the RAM 204c in Step S306 is within a range X12 determined by the corresponding second-type reference dot number and the second-type dot number threshold value prestored in the memory 231 of the RAM 204c, and whether the dot-distance appearance frequency Z13 calculated, in Step S308, based on the peak position and the peak value of the dot distances d stored, in Step S307, in the registration memory area of the RAM 204c is within a range X13 the corresponding second-type reference dot distance and the second-type dot distance threshold value prestored in the memory 231 of the RAM 204c.

When the above-mentioned two determinations both bring negative results in Step S309, the CPU 204a turns the determination result of Step S309 to NO and consequently the CPU 204a ends the process. When at least one of the two determinations brings a positive result in Step S309, the CPU 204a turns the determination result of Step S309 to YES and consequently the CPU 204a determines that the characteristic quantity of the detected background dot pattern 103 included in the original image 101 is identical to the characteristic quantity of the dot pattern of the copy-protected document. As a result, it becomes apparent that the input original image 101, for example, includes at least one of the base area 104 of the background dot pattern 103, the message area 105 of the background dot pattern 103, and the dot pattern 103 made solely of the single-sized dots 106c.

When the determination result of Step S309 is YES, as described above, the CPU 204a proceeds to Step S310 in which the CPU 204a performs the copy prohibition determination according to a predetermined standard. This predetermined standard may include a parameter and is previously stored in the memory 231 of the RAM 204c. As an alternative, this predetermined standard may be entered through the operation display panel 205 into the memory 231 of the RAM 204c.

In the way as described above, as one example, the CPU 204a determines that the input original image 101 is identical to the copy-protected document such as the contract sheet 100 of FIG. 1 when the background dot pattern 103 of the original image 101 is determined as including one of the base area 104 and the message area 105, through the copy prohibition determination performed in Step S310. As another example, the CPU 204a determines that the input original image 101 is identical to the copy-protected document such as the contract sheet 100 of FIG. 1 when the background dot pattern 103 of the original image 101 is determined as including both the base area 104 and the message area 105. As further another example, the CPU 204a determines that the input original image 111 is identical to the copy-protected document such as the contract sheet 100 of FIG. 1 when the original image 111 is determined as including the background dot pattern 113.

Thus, the CPU 204a performs the step and process of detecting the characteristic quantitative information of the background dot pattern 103 predefined as a copy-protected document from the image data of the input original image 101. The CPU 204a also performs the step and process of comparing the detected characteristic quantitative information with the corresponding second-type reference characteristic quantitative information prestored as the characteristic quantitative information of a copy-protected document in the memory 231. The CPU 204a further performs the step and process of determining whether the detected characteristic quantitative information is identical to the corresponding second-type reference characteristic quantitative information prestored in the memory 231. Thus, regardless of the types of the original image, by confirming whether the detected characteristic quantitative information is identical to the corresponding second-type reference characteristic quantitative information, the CPU 204a determines whether it is permissible to output the image data of the original image 101.

In Step S311, the CPU 204a refers to the determination result of Step S310 and determines a subsequent process. That is, the CPU 204a ends the process when the original image 101 is determined as not the copy-protected document in Step S310 and the determination result of Step S310 is NO, but it proceeds to Step S312 when the input original image 101 is determined as the copy-protected document in Step S310 and the determination result of Step S310 is YES. Then, in Step S312, the CPU 204a sends to the client PC 2001 serving as an administrator a notification of the determination result, and ends the process.

In the process of Step S312, as a first example, the CPU 204a sends e-mail to the client PC 2001 with information including the determination result and an identification code. As a second example, the CPU 204a encrypts the image data including the detected background dot pattern 103 and stored in the hard disk drive 213, for example, and sends e-mail to the client PC 2001 with the determination result and the encrypted image data.

In the above-mentioned second example, there is one condition that a software for decoding the encrypted image data is preinstalled in the client PC 2001 so that an administrator can view the encrypted image data on the client PC 2001 and easily recognize the original image 101 obtained through an inequitable reading operation.

The first example makes an administrator aware of an identification code for the original image 101 obtained through an inequitable reading operation, through the e-mail. Therefore, if an administrator knows image data assigned by the identification code, he or she could trace back the inequitable image reading operation. In the image processing apparatus 3, the system controller 204 is provided with a function for outputting image data assigned by identification codes. Two examples of such function are described above with reference to FIG. 16 and are not repeated here.

As described above, the image processing apparatus 3 is provided with the first and second copy protection systems performing the first and second copy protection operations, respectively, which are different from each other, for determining whether the detected characteristic quantitative information is identical to the first-type reference value or the second-type reference value. The first copy protection system determines whether the dot density as the detected characteristic quantitative information is identical to the corresponding first-type reference value prestored in the memory 221. The second copy protection system determines whether the dot density and the dot distance as the detected characteristic quantitative information are identical to the corresponding second-type reference values prestored in the memory 231. With this configuration, the first copy protection system allows a less number of occurrences of excessively rigorous determinations and a relatively great number of occurrences of erroneous dot detection or omission. But, in contrast to it, the second copy protection system allows a relatively great number of occurrences of excessively rigorous determinations and a less number of occurrences of erroneous dot detection or omission.

The relationships of the numbers of occurrences of excessively rigorous determinations and erroneous dot detection or omission between the first and second copy protection systems can suitably adjusted by appropriately changing the balance between the first-type dot density threshold values stored in the memory 221 and the second-type dot density threshold value stored in the memory 231. More specifically, by setting first-type dot density threshold values stored in the memory 221 to a moderate value and the second-type dot density threshold value stored in the memory 231 to a value more rigorous than the first-type dot density threshold value, the first copy protection system achieves a less number of occurrences of excessively rigorous determinations and a relatively great number of occurrences of erroneous dot detection or omission while the second copy protection system achieves a relatively great number of occurrences of excessively rigorous determinations and a less number of occurrences of erroneous dot detection or omission. By setting first-type dot density threshold values stored in the memory 221 to a value close to the second-type dot density threshold value stored in the memory 231, the first copy protection system achieves a greater number of occurrences of excessively rigorous determinations and a less number of occurrences of erroneous dot detection or omission while the second copy protection system achieves a less number of occurrences of excessively rigorous determinations and a greater number of occurrences of erroneous dot detection or omission.

Further, the relationships of the numbers of occurrences of excessively rigorous determinations and erroneous dot detection or omission between the first and second copy protection systems can suitably adjusted by appropriately changing the second-type threshold value for the dot distance appearance frequency, that is, the peak position and the peak value for the distance between adjacent two dots, stored in the memory 231. For example, the higher the second-type threshold value for the peak value is, the more excessively rigorous the determinations are. In this case, the copy protection system may severely reject a dot distance which has a value normally be treated as data taken into account. On the other hand, this setting decreases the number of erroneous dot detection or omission. Also, as another example, the higher the second-type threshold value for the peak position is, the more excessively rigorous the determinations are. In this case, the copy protection system may severely reject a dot distance which has a value normally be treated as data taken into account. On the other hand, this setting decreases the number of erroneous dot detection or omission. Therefore, when the second-type threshold values for the peak position and the peak value are set higher, the second copy protection system performs the copy protection operation in a manner with the less number of occurrences of excessively rigorous determinations and the greater number of erroneous dot detection or omission more in comparison with those of the first copy protection system.

In addition, since the first copy protection system uses the dot density and the second copy protection system uses the dot density and the dot distance, as described above, the first copy protection system features a higher speed performance of the first copy protection operation than the second copy protection system, and the second copy protection system features a higher precision performance of the second copy protection operation than the first copy protection system.

The image processing apparatus 3 activates the above-described first and second copy protection systems at the same time so that they efficiently operate in parallel to each other without wasting time.

When the first copy protection system configured with digital-circuits determines that the detected image data of the original image 101 includes the dot pattern of the registered copy-protected document, it enters and performs the reproduction prohibition process, as described above. In this case, the first copy protection system executes the determination whether to permit or prohibit the reproduction of the image by the printer 203 at high speed without wasting the time of the user. This feature of the first copy protection system is effective particularly when the image processing apparatus 3 receives an instruction for immediately reproducing input image data, distributing a scanned image, etc. To distribute a scanned image which may possibly be a copy-prohibited document, there are several ways; e-mail, facsimile transmission, data transmission, etc. However, the copy prohibition can be achieved by banning a distribution of the original image 101, for example, when a document is determined as a copy-prohibited document in the way as described above.

In contrast to it, the second copy protection system performs the reproduction prohibition process at precision higher than the first copy protection system since the second copy protection system uses the dot density and the dot distance. In order not to waste the time of the user, when the first copy protection system determines that the detected image data of the original image 101 does not include the dot pattern of the registered copy-protected document, the first copy protection system has a higher priority to permit the reproduction over determination by the second copy protection system. That is, the first copy protection system permits the reproduction of the original image 101 without waiting the determination result of the second copy protection system. In this instance, it is possible that the determination by the first copy protection system is erroneous due to an occurrence of erroneous dot detection or omission. Therefore, when the second copy protection system determines that the detected image data of the original image 101 includes the dot pattern of the registered copy-protected document, the image processing apparatus 3 sends a notification of such determination by the second copy protection system to the client PC 2001 so as to enable the administrator to trace back the inequitable copy operation.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

What is claimed is:

1. An image processing apparatus, comprising:
    a first memory storing a first reference value representing a first characteristic quantity of a predetermined background dot pattern;
    a first copy protector unit configured to perform a first copy protection operation for detecting a characteristic quantity from image data of an original image, comparing the characteristic quantity from the image data of the original image with the first reference value stored in the first memory, and determining whether the characteristic quantity from the image data of the original image is identical to the first reference value;
    a second memory storing a second reference value representing a second characteristic quantity of the predetermined background dot pattern; and
    a second copy protector unit configured to perform a second copy protection operation, different from the first copy protection operation, for detecting a characteristic quantity from the image data of the original image, comparing the characteristic quantity from the image data of the original image with the second reference value stored in the second memory, and determining whether the characteristic quantity from the image data of the original image is identical to the second reference value,
    wherein the first and second copy protector units simultaneously perform the first and second copy protection operations, respectively, in parallel.

2. An image processing apparatus according to claim 1, wherein the predetermined background dot pattern is a dot pattern in which each of the first and second characteristic quantities is produced based on a relationship between dots having sizes substantially equal to each other and which is defined as a copy-prohibited background dot pattern based on the first and second characteristic quantities.

3. An image processing apparatus according to claim 1, wherein the first copy protector unit performs the first copy protection operation with digital circuits and the second copy protector unit performs the second copy protection operation in accordance with a program installed in a computer included in the image processing apparatus.

4. An image processing apparatus according to claim 1, wherein the first copy protector unit is set to a condition to perform the first copy protection operation with relatively small number of occurrences of excessively rigorous determinations and a relatively great number of occurrences of erroneous dot detection or omission and the second copy protector unit is set to a condition to perform the second copy protection operation with a relatively great number of occurrences of excessively rigorous determinations and a relatively small number of occurrences of erroneous dot detection or omission.

5. An image processing apparatus according to claim 1, wherein the first copy protector unit determines that the characteristic quantity from the image data of the original image is identical to the first reference value when a difference between the characteristic quantity from the image data of the original image and the first reference value is smaller than a predetermined threshold value.

6. An image processing apparatus according to claim 1, wherein the second copy protector unit determines that the characteristic quantity from the image data of the original image is identical to the second reference value when a difference between the characteristic quantity from the image data of the original image and the second reference value is smaller than a predetermined threshold value.

7. An image processing apparatus according to claim 1, wherein the first copy protector unit determines that the characteristic quantity from the image data of the original image is identical to the first reference value when a difference between the characteristic quantity from the image data of the original image and the first reference value is smaller than a first predetermined threshold value, and the second copy protector unit determines that the characteristic quantity from the image data of the original image is identical to the second reference value when a difference between the characteristic quantity from the image data of the original image and the second reference value is smaller than a second predetermined threshold value which is smaller than the first predetermined threshold value.

8. An image processing apparatus according to claim 1, wherein the predetermined background dot pattern is a dot pattern in which each of the first and second characteristic quantities is produced based on a relationship between dots having sizes substantially equal to each other and which is defined as a copy-protected background dot pattern based on the first and second characteristic quantities, the first copy protector unit detects a dot density as a characteristic quantity and performs a process for determining whether the detected characteristic quantity is identical to the first reference value, and the second copy protector unit detects a dot distance as a characteristic quantity and performs a process for determining whether the detected characteristic quantity is identical to the second reference value.

9. An image processing apparatus according to claim 1, wherein the first copy protector unit performs a first reproduction prohibition process upon determining the detected characteristic quantity as identical to the first reference value, and the second copy protector unit performs a second reproduction prohibition process upon determining the detected characteristic quantity as identical to the second reference value.

10. An image processing apparatus according to claim 9, wherein the first reproduction prohibition process is a process for prohibiting a reproduction of the image data of the original image and the second reproduction prohibition process is a process for sending a notification to external equipment of a determination result.

11. An image processing apparatus, comprising:
    first storing means for storing a first reference value representing a first characteristic quantity of a predetermined background dot pattern;

second storing means for storing a second reference value representing a second characteristic quantity of the predetermined background dot pattern;

first copy protecting means for performing a first copy protection operation which detects a characteristic quantity from image data of an original image, compares the characteristic quantity from the image data of the original image with the first reference value stored in the first storing means, and determines whether the characteristic quantity from the image data of the original image is identical to the first reference value; and second copy protecting means for performing a second copy protection operation, different from the first copy protection operation, which detects a characteristic quantity from the image data of the original image, compares the characteristic quantity from the image data of the original image with the second reference value stored in the second storing means, and determines whether the characteristic quantity from the image data of the original image is identical to the second reference value, wherein the first and second copy protecting means simultaneously perform the first and second copy protection operations.

12. An image processing apparatus according to claim 11, wherein the predetermined background dot pattern is a dot pattern in which each of the first and second characteristic quantities is produced based on a relationship between dots having sizes substantially equal to each other and which is defined as a copy-prohibited background dot pattern based on the first and second characteristic quantities.

13. An image processing apparatus according to claim 11, wherein the first copy protecting means performs the first copy protection operation with digital circuits and the second copy protecting means performs the second copy protection operation in accordance with a program installed in a computer included in the image processing apparatus.

14. An image processing apparatus according to claim 11, wherein the first copy protecting means is set to a condition to perform the first copy protection operation with relatively small number of occurrences of excessively rigorous determinations and a relatively great number of occurrences of erroneous dot detection or omission and the second copy protecting means is set to a condition to perform the second copy protection operation with a relatively great number of occurrences of excessively rigorous determinations and a relatively small number of occurrences of erroneous dot detection or omission.

15. An image processing apparatus according to claim 11, wherein the first copy protecting means determines that the characteristic quantity from the image data of the original image is identical to the first reference value when a difference between the characteristic quantity from the image data of the original image and the first reference value is smaller than a predetermined threshold value.

16. An image processing apparatus according to claim 11, wherein the second copy protecting means determines that the characteristic quantity from the image data of the original image is identical to the second reference value when a difference between the characteristic quantity from the image data of the original image and the second reference value is smaller than a predetermined threshold value.

17. An image processing apparatus according to claim 11, wherein the first copy protecting means determines that the characteristic quantity from the image data of the original image is identical to the first reference value when a difference between the characteristic quantity from the image data of the original image and the first reference value is smaller than a first predetermined threshold value, and the second copy protecting means determines that the characteristic quantity from the image data of the original image is identical to the second reference value when a difference between the characteristic quantity from the image data of the original image and the second reference value is smaller than a second predetermined threshold value which is smaller than the first predetermined threshold value.

18. An image processing apparatus according to claim 11, wherein the predetermined background dot pattern is a dot pattern in which each of the first and second characteristic quantities is produced based on a relationship between dots having sizes substantially equal to each other and which is defined as a copy-protected background dot pattern based on the first and second characteristic quantities, the first copy protecting means detects a dot density as a characteristic quantity and performs a process for determining whether the detected characteristic quantity is identical to the first reference value, and the second copy protecting means detects a dot distance as a characteristic quantity and performs a process for determining whether the detected characteristic quantity is identical to the second reference value.

19. An image processing apparatus according to claim 11, wherein the first copy protecting means performs a first reproduction prohibition process upon determining the detected characteristic quantity as identical to the first reference value, and the second copy protecting means performs a second reproduction prohibition process upon determining the detected characteristic quantity as identical to the second reference value.

20. An image processing apparatus according to claim 19, wherein the first reproduction prohibition process is a process for prohibiting a reproduction of the image data of the original image and the second reproduction prohibition process is a process for sending a notification to external equipment of a determination result.

21. An image processing method, comprising the steps of:

storing a first reference value representing a first characteristic quantity of a predetermined background dot pattern;

storing a second reference value representing a second characteristic quantity of the predetermined background dot pattern;

performing a first copy protection operation which comprises sub-steps of:
 detecting a characteristic quantity from image data of an original image;
 comparing the characteristic quantity from the image data of the original image with the first reference value stored in the first reference value storing step; and
 determining whether the characteristic quantity from the image data of the original image is identical to the first reference value, and performing a second copy protection operation, different from the first copy protection operation, which comprises sub-steps of:
 detecting a characteristic quantity from the image data of the original image;
 comparing the characteristic quantity from the image data of the original image with the second reference value stored in the second reference value storing step; and
 determining whether the characteristic quantity from the image data of the original image is identical to the second reference value, wherein the performing steps of the first and second copy protection operations simultaneously perform the first and second copy protection operations.

22. An image processing method according to claim 21, wherein the predetermined background dot pattern is a dot pattern in which each of the first and second characteristic quantities is produced based on a relationship between dots having sizes substantially equal to each other and which is defined as a copy-prohibited background dot pattern based on the first and second characteristic quantities.

23. An image processing method according to claim 21, wherein the step of the first copy protection operation performs the first copy protection operation with digital circuits and the step of the second copy protection operation performs the second copy protection operation in accordance with a program installed in a computer included in the image processing apparatus.

24. An image processing method according to claim 21, wherein the step of the first copy protection operation is set to a condition to perform the first copy protection operation with relatively small number of occurrences of excessively rigorous determinations and a relatively great number of occurrences of erroneous dot detection or omission and the step of the second copy protection operation is set to a condition to perform the second copy protection operation with a relatively great number of occurrences of excessively rigorous determinations and a relatively small number of occurrences of erroneous dot detection or omission.

25. An image processing method according to claim 21, wherein the step of the first copy protection operation determines that the characteristic quantity from the image data of the original image is identical to the first reference value when a difference between the characteristic quantity from the image data of the original image and the first reference value is smaller than a predetermined threshold value.

26. An image processing method according to claim 21, wherein the step of the second copy protection operation determines that the characteristic quantity from the image data of the original image is identical to the second reference value when a difference between the characteristic quantity from the image data of the original image and the second reference value is smaller than a predetermined threshold value.

27. An image processing method according to claim 21, wherein the step of the first copy protection operation determines that the characteristic quantity from the image data of the original image is identical to the first reference value when a difference between the characteristic quantity from the image data of the original image and the first reference value is smaller than a first predetermined threshold value, and the step of the second copy protection operation determines that the characteristic quantity from the image data of the original image is identical to the second reference value when a difference between the characteristic quantity from the image data of the original image and the second reference value is smaller than a second predetermined threshold value which is smaller than the first predetermined threshold value.

28. An image processing method according to claim 21, wherein the predetermined background dot pattern is a dot pattern in which each of the first and second characteristic quantities is produced based on a relationship between dots having sizes substantially equal to each other and which is defined as a copy-protected background dot pattern based on the first and second characteristic quantities, the step of the first copy protection operation detects a dot density as a characteristic quantity and performs a process for determining whether the detected characteristic quantity is identical to the first reference value, and the step of the second copy protection operation detects a dot distance as a characteristic quantity and performs a process for determining whether the detected characteristic quantity is identical to the second reference value.

29. An image processing method according to claim 21, wherein the step of the first copy protection operation performs a first reproduction prohibition process upon determining the detected characteristic quantity as identical to the first reference value, and the step of the second copy protection operation performs a second reproduction prohibition process upon determining the detected characteristic quantity as identical to the second reference value.

30. An image processing method according to claim 29, wherein the first reproduction prohibition process is a process for prohibiting a reproduction of the image data of the original image and the second reproduction prohibition process is a process for sending a notification to external equipment of a determination result.

31. A computer program product stored on a computer readable storage medium for instructing a computer which has digital circuits for performing a first copy protection operation, to execute a second copy protection operation which is smaller than the first copy protection operation, the second copy protection operation comprising the steps of:
   storing a second reference value representing a second characteristic quantity of a predetermined background dot pattern;
   detecting a characteristic quantity from image data of an original image;
   comparing the characteristic quantity from the image data of the original image with the second reference value stored in the second reference value storing step;
   determining whether the characteristic quantity from the image data of the original image is identical to the second reference value,
   wherein the first copy protection operation executed by the digital circuits of the computer comprises the steps of:
      storing a first reference value representing a first characteristic quantity of the predetermined background dot pattern;
      detecting a characteristic quantity from the image data of the original image;
      comparing the characteristic quantity from the image data of the original image with the first reference value stored in the first reference value storing step; and
      determining whether the characteristic quantity from the image data of the original image is identical to the first reference value,
   wherein the first and second copy protection operations are simultaneously performed.

32. A computer program product according to claim 31, wherein the predetermined background dot pattern is a dot pattern in which each of the first and second characteristic quantities is produced based on a relationship between dots having sizes substantially equal to each other and which is defined as a copy-prohibited background dot pattern based on the first and second characteristic quantities.

33. A computer program product according to claim 31, wherein the first copy protection operation is set to conditions of relatively small number of occurrences of excessively rigorous determinations and a relatively great number of occurrences of erroneous dot detection or omission and the second copy protection operation is set to conditions of a relatively great number of occurrences of excessively rigorous determinations and a relatively small number of occurrences of erroneous dot detection or omission.

34. A computer program product according to claim 31, wherein the determining step of the second copy protection operation determines that the characteristic quantity from the image data of the original image is identical to the second reference value when a difference between the characteristic quantity from the image data of the original image and the second reference value is smaller than a predetermined threshold value.

35. A computer program product according to claim 31, wherein the determining step of the first copy protection operation determines that the characteristic quantity from the image data of the original image is identical to the first reference value when a difference between the characteristic quantity from the image data of the original image and the first reference value is smaller than a first predetermined threshold value, and the determining step of the second copy protection operation determines that the characteristic quantity from the image data of the original image is identical to the second reference value when a difference between the characteristic quantity from the image data of the original image and the second reference value is smaller than a second predetermined threshold value which is smaller than the first predetermined threshold value.

36. A computer program product according to claim 31, wherein the predetermined background dot pattern is a dot pattern in which each of the first and second characteristic quantities is produced based on a relationship between dots having sizes substantially equal to each other and which is defined as a copy-protected background dot pattern based on the first and second characteristic quantities,
wherein the detecting step of the first copy protection operation detects a dot density as a characteristic quantity and the determining step of the first copy protection operation determines whether the detected characteristic quantity is identical to the first reference value, and
wherein the detecting step of the second copy protection operation detects a dot distance as a characteristic quantity and the determining step of the second copy protection operation determines whether the detected characteristic quantity is identical to the second reference value.

37. A computer program product according to claim 31, wherein the first copy protection operation further comprises the step of performing a first reproduction prohibition process upon a time the determining step of the first copy protection operation determines that the detected characteristic quantity as identical to the first reference value, and
the computer program product further comprising the step of performing a second reproduction prohibition process upon determining the detected characteristic quantity as identical to the second reference value by the determining step of the second copy protection operation.

38. A computer program product according to claim 37, wherein the first reproduction prohibition process is a process for prohibiting a reproduction of the image data of the original image and the second reproduction prohibition process is a process for sending a notification to external equipment of a determination result.

39. A computer readable storage medium storing computer instructions for instructing a computer which has digital circuits for performing a first copy protection operation, to execute a second copy protection operation which is smaller than the first copy protection operation, the computer instructions comprising the steps of:

storing a second reference value representing a second characteristic quantity of a predetermined background dot pattern;
detecting a characteristic quantity from image data of an original image;
comparing the characteristic quantity from the image data of the original image with the second reference value stored in the second reference value storing step; and
determining whether the characteristic quantity from the image data of the original image is identical to the second reference value,
wherein the first copy protection operation executed by the digital circuits of the computer comprises the steps of:
storing a first reference value representing a first characteristic quantity of the predetermined background dot pattern;
detecting a characteristic quantity from the image data of the original image;
comparing the characteristic quantity from the image data of the original image with the first reference value stored in the first reference value storing step; and
determining whether the characteristic quantity from the image data of the original image is identical to the first reference value,
wherein the first and second copy protection operations are simultaneously performed.

40. A computer readable storage medium according to claim 39, wherein the predetermined background dot pattern is a dot pattern in which each of the first and second characteristic quantities is produced based on a relationship between dots having sizes substantially equal to each other and which is defined as a copy-prohibited background dot pattern based on the first and second characteristic quantities.

41. A computer readable storage medium according to claim 39, wherein the first copy protection operation is set to conditions of relatively small number of occurrences of excessively rigorous determinations and a relatively great number of occurrences of erroneous dot detection or omission and the second copy protection operation is set to conditions of a relatively great number of occurrences of excessively rigorous determinations and a relatively small number of occurrences of erroneous dot detection or omission.

42. A computer readable storage medium according to claim 39, wherein the determining step of the second copy protection operation determines that the characteristic quantity from the image data of the original image is identical to the second reference value when a difference between the characteristic quantity from the image data of the original image and the second reference value is smaller than a predetermined threshold value.

43. A computer readable storage medium according to claim 39, wherein the determining step of the first copy protection operation determines that the characteristic quantity from the image data of the original image is identical to the first reference value when a difference between the characteristic quantity from the image data of the original image and the first reference value is smaller than a first predetermined threshold value, and the determining step of the second copy protection operation determines that the characteristic quantity from the image data of the original image is identical to the second reference value when a difference between the characteristic quantity from the image data of the original image and the second reference value is smaller than a second predetermined threshold value which is smaller than the first predetermined threshold value.

44. A computer readable storage medium according to claim 39, wherein the predetermined background dot pattern is a dot pattern in which each of the first and second characteristic quantities is produced based on a relationship between dots having sizes substantially equal to each other and which is defined as a copy-protected background dot pattern based on the first and second characteristic quantities, wherein the detecting step of the first copy protection operation detects a dot density as a characteristic quantity and the determining step of the first copy protection operation determines whether the detected characteristic quantity is identical to the first reference value, and wherein the detecting step of the second copy protection operation detects a dot distance as a characteristic quantity and the determining step of the second copy protection operation determines whether the detected characteristic quantity is identical to the second reference value.

45. A computer readable storage medium according to claim 39, wherein the first copy protection operation further comprises the step of performing a first reproduction prohibition process upon a time the determining step of the first copy protection operation determines that the detected characteristic quantity as identical to the first reference value, and the computer program product further comprising the step of performing a second reproduction prohibition process upon determining the detected characteristic quantity as identical to the second reference value by the determining step of the second copy protection operation.

46. A computer readable storage medium according to claim 45, wherein the first reproduction prohibition process is a process for prohibiting a reproduction of the image data of the original image and the second reproduction prohibition process is a process for sending a notification to external equipment of a determination result.

47. An image processing apparatus, comprising:

a first memory storing a first reference value representing a first characteristic quantity of a predetermined background dot pattern;

a first copy protector unit configured to perform a first copy protection operation for detecting a characteristic quantity from image data of an original image, comparing the characteristic quantity from the image data of the original image with the first reference value stored in the first memory, and determining whether the characteristic quantity from the image data of the original image is identical to the first reference value;

a second memory storing a second reference value representing a second characteristic quantity of the predetermined background dot pattern; and a second copy protector unit configured to perform a second copy protection operation, different from the first copy protection operation, for detecting a characteristic quantity from the image data of the original image, comparing the characteristic quantity from the image data of the original image with the second reference value stored in the second memory, and determining whether the characteristic quantity from the image data of the original image is identical to the second reference value, wherein the predetermined background dot pattern is a dot pattern in which each of the first and second characteristic quantities is produced based on a relationship between dots having sizes substantially equal to each other and which is defined as a copy-protected background dot pattern based on the first and second characteristic quantities, the first copy protector unit is configured to detect a dot density as a characteristic quantity and is configured to perform a process for determining whether the detected characteristic quantity is identical to the first reference value, and the second copy protector unit is configured to detect a dot distance as a characteristic quantity and is configured to perform a process for determining whether the detected characteristic quantity is identical to the second reference value.

48. An image processing apparatus, comprising:

a first memory storing a first reference value representing a first characteristic quantity of a predetermined background dot pattern;

a first copy protector unit configured to perform a first copy protection operation for detecting a characteristic quantity from image data of an original image, comparing the characteristic quantity from the image data of the original image with the first reference value stored in the first memory, and determining whether the characteristic quantity from the image data of the original image is identical to the first reference value;

a second memory storing a second reference value representing a second characteristic quantity of the predetermined background dot pattern; and a second copy protector unit configured to perform a second copy protection operation, different from the first copy protection operation, for detecting a characteristic quantity from the image data of the original image, comparing the characteristic quantity from the image data of the original image with the second reference value stored in the second memory, and determining whether the characteristic quantity from the image data of the original image is identical to the second reference value, wherein the first copy protector unit is configured to perform a first reproduction prohibition process upon determining the detected characteristic quantity as identical to the first reference value, and the second copy protector unit is configured to perform a second reproduction prohibition process upon determining the detected characteristic quantity as identical to the second reference value, wherein the first reproduction prohibition process is a process for prohibiting a reproduction of the image data of the original image and the second reproduction prohibition process is a process for sending a notification to external equipment of a determination result.

49. An image processing apparatus, comprising:

first storing means for storing a first reference value representing a first characteristic quantity of a predetermined background dot pattern;

second storing means for storing a second reference value representing a second characteristic quantity of the predetermined background dot pattern;

first copy protecting means for performing a first copy protection operation which detects a characteristic quantity from image data of an original image, compares the characteristic quantity from the image data of the original image with the first reference value stored in the first storing means, and determines whether the characteristic quantity from the image data of the original image is identical to the first reference value; and second copy protecting means for performing a second copy protection operation, different from the first copy protection operation, which detects a characteristic quantity from the image data of the original image, compares the characteristic quantity from the image data of the original image with the second reference value stored in the second storing means, and determines whether the characteristic quantity from the image data of the original image is identical to the second reference value, wherein the predetermined background dot pattern is a dot pattern in which each of the first and second characteristic quantities is produced based on a relationship between dots having sizes substantially equal to each other and which is defined as a copy-protected background dot pattern based on the first and second characteristic quantities, the first copy protecting means is configured to detect a dot density as a characteristic quantity and is configured to perform a process for determining whether the detected characteristic quantity is identical to the first reference value, and the second copy protecting means is configured to detect a dot distance as a characteristic quantity and is configured to perform a process for determining whether the detected characteristic quantity is identical to the second reference value.

50. An image processing apparatus, comprising:

first storing means for storing a first reference value representing a first characteristic quantity of a predetermined background dot pattern;

second storing means for storing a second reference value representing a second characteristic quantity of the predetermined background dot pattern;

first copy protecting means for performing a first copy protection operation which detects a characteristic quantity from image data of an original image, compares the characteristic quantity from the image data of the original image with the first reference value stored in the first storing means, and determines whether the characteristic quantity from the image data of the original image is identical to the first reference value; and second copy protecting means for performing a second copy protection operation, different from the first copy protection operation, which detects a characteristic quantity from the image data of the original image, compares the characteristic quantity from the image data of the original image with the second reference value stored in the second storing means, and determines whether the characteristic quantity from the image data of the original image is identical to the second reference value, wherein the first copy protecting means is configured to perform a first reproduction prohibition process upon determining the detected characteristic quantity as identical to the first reference value, and the second copy protecting means is configured to perform a second reproduction prohibition process upon determining the detected characteristic quantity as identical to the second reference value, wherein the first reproduction prohibition process is a process for prohibiting a reproduction of the image data of the original image and the second reproduction prohibition process is a process for sending a notification to external equipment of a determination result.

51. An image processing method, comprising the steps of:

storing a first reference value representing a first characteristic quantity of a predetermined background dot pattern;

storing a second reference value representing a second characteristic quantity of the predetermined background dot pattern;

performing a first copy protection operation which comprises sub-steps of:

detecting a characteristic quantity from image data of an original image;

comparing the characteristic quantity from the image data of the original image with the first reference value stored in the first reference value storing step; and determining whether the characteristic quantity from the image data of the original image is identical to the first reference value, and performing a second copy protection operation, different from the first copy protection operation, which comprises sub-steps of:

detecting a characteristic quantity from the image data of the original image;

comparing the characteristic quantity from the image data of the original image with the second reference value stored in the second reference value storing step; and determining whether the characteristic quantity from the image data of the original image is identical to the second reference value, wherein the predetermined background dot pattern is a dot pattern in which each of the first and second characteristic quantities is produced based on a relationship between dots having sizes substantially equal to each other and which is defined as a copy-protected background dot pattern based on the first and second characteristic quantities, the step of the first copy protection operation is configured to detect a dot density as a characteristic quantity and is configured to perform a process for determining whether the detected characteristic quantity is identical to the first reference value, and the step of the second copy protection operation is configured to detect a dot distance as a characteristic quantity and is configured to perform a process for determining whether the detected characteristic quantity is identical to the second reference value.

52. An image processing method, comprising the steps of:

storing a first reference value representing a first characteristic quantity of a predetermined background dot pattern;

storing a second reference value representing a second characteristic quantity of the predetermined background dot pattern;

performing a first copy protection operation which comprises sub-steps of:

detecting a characteristic quantity from image data of an original image;

comparing the characteristic quantity from the image data of the original image with the first reference value stored in the first reference value storing step; and determining whether the characteristic quantity from the image data of the original image is identical to the first reference value, and performing a second copy protection operation, different from the first copy protection operation, which comprises sub-steps of:

detecting a characteristic quantity from the image data of the original image;

comparing the characteristic quantity from the image data of the original image with the second reference value stored in the second reference value storing step; and determining whether the characteristic quantity from the image data of the original image is identical to the second reference value, wherein the step of the first copy protection operation is configured to perform a first reproduction prohibition process upon determining the detected characteristic quantity as identical to the first reference value, and the step of the second copy protection operation is configured to perform a second reproduction prohibition process upon determining the detected characteristic quantity as identical to the second reference value, wherein the first reproduction prohibition process is a process for prohibiting a reproduction of the image data of the original image and the second reproduction prohibition process is a process for sending a notification to external equipment of a determination result.

53. A computer program product stored on a computer readable storage medium for instructing a computer which has digital circuits for performing a first copy protection operation, to execute a second copy protection operation which is smaller than the first copy protection operation, the second copy protection operation comprising the steps of:

storing a second reference value representing a second characteristic quantity of a predetermined background dot pattern;

detecting a characteristic quantity from image data of an original image;

comparing the characteristic quantity from the image data of the original image with the second reference value stored in the second reference value storing step;

determining whether the characteristic quantity from the image data of the original image is identical to the second reference value, wherein the first copy protection operation executed by the digital circuits of the computer comprises the steps of:

storing a first reference value representing a first characteristic quantity of the predetermined background dot pattern;

detecting a characteristic quantity from the image data of the original image;

comparing the characteristic quantity from the image data of the original image with the first reference value stored in the first reference value storing step; and determining whether the characteristic quantity from the image data of the original image is identical to the first reference value, wherein the predetermined background dot pattern is a dot pattern in which each of the first and second characteristic quantities is produced based on a relationship between dots having sizes substantially equal to each other and which is defined as a copy-protected background dot pattern based on the first and second characteristic quantities, wherein the detecting step of the first copy protection operation detects a dot density as a characteristic quantity and the determining step of the first copy protection operation determines whether the detected characteristic quantity is identical to the first reference value, and wherein the detecting step of the second copy protection operation detects a dot distance as a characteristic quantity and the determining step of the second copy protection operation determines whether the detected characteristic quantity is identical to the second reference value.

54. A computer program product stored on a computer readable storage medium for instructing a computer which has digital circuits for performing a first copy protection operation, to execute a second copy protection operation which is smaller than the first copy protection operation, the second copy protection operation comprising the steps of:

storing a second reference value representing a second characteristic quantity of a predetermined background dot pattern;

detecting a characteristic quantity from image data of an original image;

comparing the characteristic quantity from the image data of the original image with the second reference value stored in the second reference value storing step;

determining whether the characteristic quantity from the image data of the original image is identical to the second reference value, wherein the first copy protection operation executed by the digital circuits of the computer comprises the steps of:

storing a first reference value representing a first characteristic quantity of the predetermined background dot pattern;

detecting a characteristic quantity from the image data of the original image;

comparing the characteristic quantity from the image data of the original image with the first reference value stored in the first reference value storing step; and determining whether the characteristic quantity from the image data of the original image is identical to the first reference value, wherein the first reproduction prohibition process is a process for prohibiting a reproduction of the image data of the original image and the second reproduction prohibition process is a process for sending a notification to external equipment of a determination result.

55. A computer readable storage medium storing computer instructions for instructing a computer which has digital circuits for performing a first copy protection operation, to execute a second copy protection operation which is smaller than the first copy protection operation, the computer instructions comprising the steps of:

storing a second reference value representing a second characteristic quantity of a predetermined background dot pattern;

detecting a characteristic quantity from image data of an original image;

comparing the characteristic quantity from the image data of the original image with the second reference value stored in the second reference value storing step; and determining whether the characteristic quantity from the image data of the original image is identical to the second reference value, wherein the first copy protection operation executed by the digital circuits of the computer comprises the steps of:

storing a first reference value representing a first characteristic quantity of the predetermined background dot pattern;

detecting a characteristic quantity from the image data of the original image;

comparing the characteristic quantity from the image data of the original image with the first reference value stored in the first reference value storing step; and determining whether the characteristic quantity from the image data of the original image is identical to the first reference value, wherein the predetermined background dot pattern is a dot pattern in which each of the first and second characteristic quantities is produced based on a relationship between dots having sizes substantially equal to each other and which is defined as a copy-protected background dot pattern based on the first and second characteristic quantities, wherein the detecting step of the first copy protection operation detects a dot density as a characteristic quantity and the determining step of the first copy protection operation determines whether the detected characteristic quantity is identical to the first reference value, and wherein the detecting step of the second copy protection operation detects a dot distance as a characteristic quantity and the determining step of the second copy protection operation determines whether the detected characteristic quantity is identical to the second reference value.

56. A computer readable storage medium storing computer instructions for instructing a computer which has digital circuits for performing a first copy protection operation, to execute a second copy protection operation which is smaller than the first copy protection operation, the computer instructions comprising the steps of:

storing a second reference value representing a second characteristic quantity of a predetermined background dot pattern;

detecting a characteristic quantity from image data of an original image;

comparing the characteristic quantity from the image data of the original image with the second reference value stored in the second reference value storing step; and determining whether the characteristic quantity from the image data of the original image is identical to the second reference value, wherein the first copy protection operation executed by the digital circuits of the computer comprises the steps of:

storing a first reference value representing a first characteristic quantity of the predetermined background dot pattern;

detecting a characteristic quantity from the image data of the original image;

comparing the characteristic quantity from the image data of the original image with the first reference value stored in the first reference value storing step; and determining whether the characteristic quantity from the image data of the original image is identical to the first reference value, wherein the first reproduction prohibition process is a process for prohibiting a reproduction of the image data of the original image and the second reproduction prohibition process is a process for sending a notification to external equipment of a determination result.

* * * * *